United States Patent
Hashimoto

(10) Patent No.: US 10,476,958 B2
(45) Date of Patent: Nov. 12, 2019

(54) HYPER-CONVERGED FLASH ARRAY SYSTEM

(71) Applicant: TOSHIBA MEMORY CORPORATION, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 178 days.

(21) Appl. No.: 15/253,679

(22) Filed: Aug. 31, 2016

(65) Prior Publication Data

US 2017/0180478 A1 Jun. 22, 2017

Related U.S. Application Data

(60) Provisional application No. 62/268,366, filed on Dec. 16, 2015.

(51) Int. Cl.
*G06F 15/16* (2006.01)
*H04L 29/08* (2006.01)
(Continued)

(52) U.S. Cl.
CPC .......... *H04L 67/1097* (2013.01); *G06F 3/061* (2013.01); *G06F 3/0604* (2013.01);
(Continued)

(58) Field of Classification Search
CPC . H04L 67/1097; G06F 3/0604; G06F 3/0659; G06F 3/0665; G06F 3/067; G06F 3/0688; G06F 12/0246
(Continued)

(56) References Cited

U.S. PATENT DOCUMENTS 8,539,315 B2 9/2013 Hashimoto
8,984,375 B2 3/2015 Hashimoto
(Continued)

FOREIGN PATENT DOCUMENTS

WO 2014039845 A1 3/2014
WO 2014039922 A2 3/2014

OTHER PUBLICATIONS

U.S. Appl. No. 62/153,655, filed Apr. 28, 2015.
U.S. Appl. No. 62/138,315, filed Mar. 25, 2015.
U.S. Appl. No. 62/142,937, filed Apr. 3, 2015.

*Primary Examiner* — Sm A Rahman
(74) *Attorney, Agent, or Firm* — Kim & Stewart LLP

(57) ABSTRACT

A distributed system includes a plurality of storage systems and a network connecting the storage systems. Each storage system includes a host having a processor and a memory, and a storage device having a controller and a nonvolatile memory. When a first storage system receives, a second storage system, a write command, write data, and size information of the write data, the controller in the first storage system determines an address of the nonvolatile memory of the first storage system in which the write data are to be written, based on the write command and the size information, writes the write data in the nonvolatile memory associated with the address, and transmits the address to the second storage system, and the processor of the second storage system stores management data indicating correspondence between identification information of the write data and the address in the memory of the second storage system.

18 Claims, 26 Drawing Sheets

(51) Int. Cl.
*G06F 3/06* (2006.01)
*G06F 12/02* (2006.01)

(52) U.S. Cl.
CPC .......... *G06F 3/0659* (2013.01); *G06F 3/0688* (2013.01); *G06F 12/0246* (2013.01); *G06F 3/067* (2013.01); *G06F 3/0665* (2013.01); *G06F 2212/1024* (2013.01); *G06F 2212/7201* (2013.01)

(58) Field of Classification Search
USPC ......................................................... 709/219
See application file for complete search history.

(56) References Cited

U.S. PATENT DOCUMENTS

| | | | |
|---|---|---|---|
| 2009/0327372 A1* | 12/2009 | Ylonen | G06F 12/0253 |
| 2011/0273834 A1* | 11/2011 | Moriai | G06F 1/20 |
| | | | 361/679.32 |
| 2013/0159785 A1* | 6/2013 | Hashimoto | G06F 11/004 |
| | | | 714/47.2 |
| 2013/0290281 A1* | 10/2013 | Yokoi | G06F 3/0608 |
| | | | 707/693 |
| 2015/0074371 A1 | 3/2015 | Hashimoto et al. | |
| 2016/0034354 A1 | 2/2016 | Hashimoto et al. | |

* cited by examiner

FIG. 11

Block mapping table 46

Free block table 461

| Block address | Erase count |
|---|---|
| ... | ... |
| ... | ... |
| ... | ... |
| ... | ... |

Active block table 462

| Block address | Erase count |
|---|---|
| ... | ... |
| ... | ... |
| ... | ... |
| ... | ... |

Bad block table 463

| Block address | Erase count |
|---|---|
| ... | ... |
| ... | ... |
| ... | ... |
| ... | ... |

Input block table 464

| Block address | Page address to be written | Erase count |
|---|---|---|
| ... | ... | ... |
| ... | ... | ... |
| ... | ... | ... |

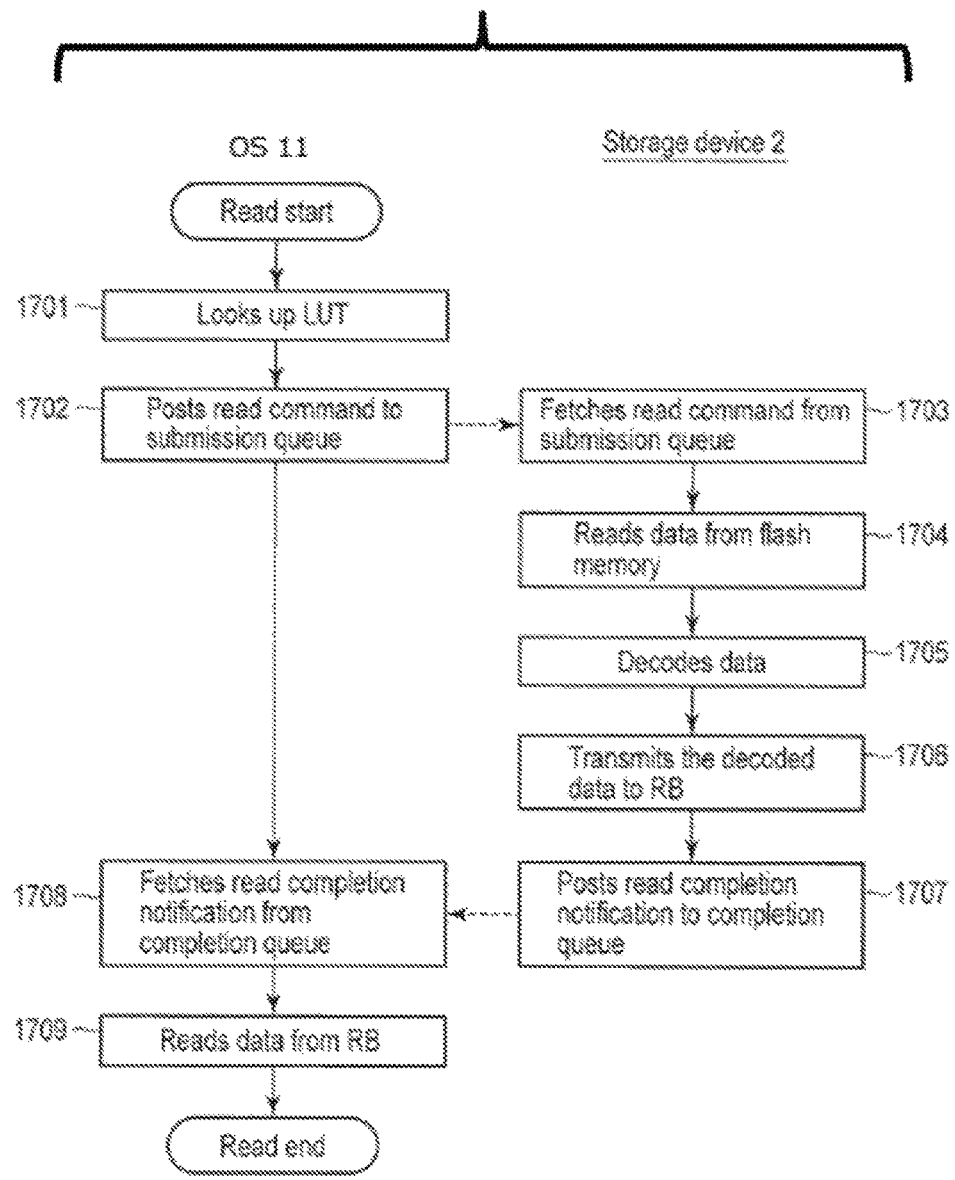

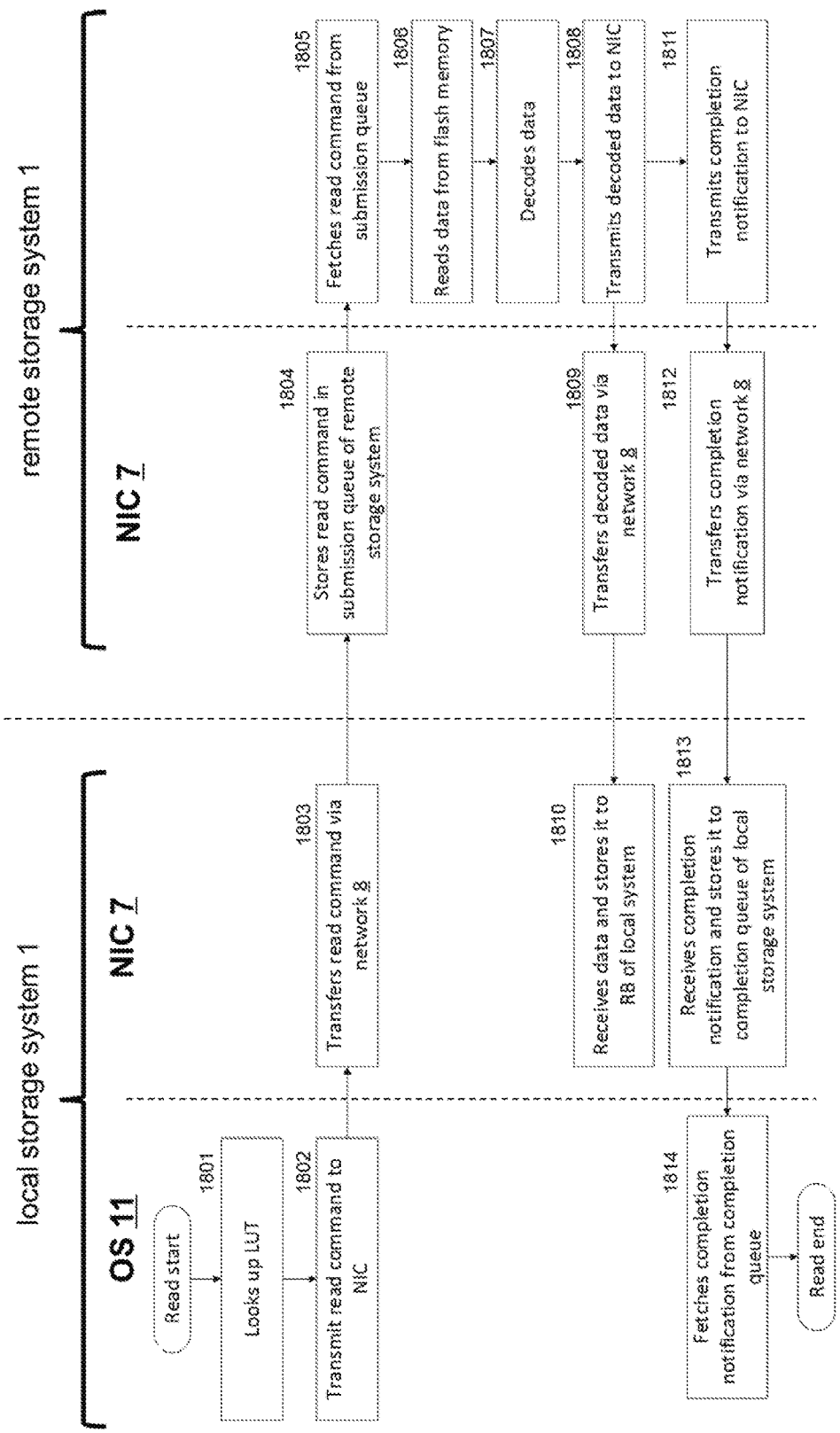

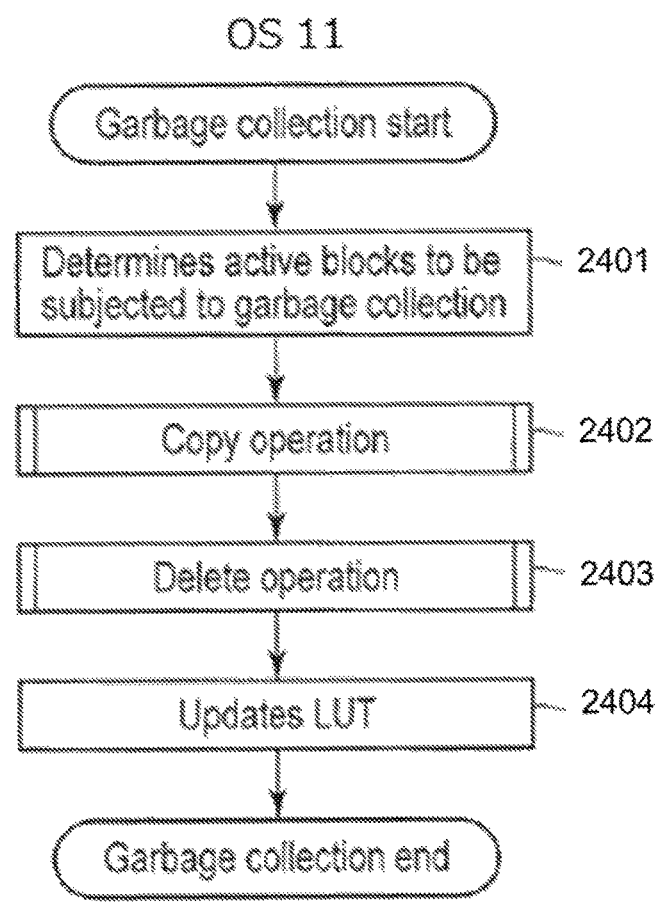

HYPER-CONVERGED FLASH ARRAY SYSTEM

CROSS-REFERENCE TO RELATED APPLICATION

This application is based upon and claims the benefit of priority from Provisional Application No. 62/268,366, filed Dec. 16, 2015, the entire contents of which are incorporated herein by reference.

FIELD

The present disclosure generally relates to a storage system including a host and a storage device, in particular, a storage system that is capable of physical access over storage interface.

BACKGROUND

A storage system of one type includes a host device and one or more storage devices connected to the host device. In such a storage system, the host device manages and controls access to the one or more storage devices, i.e., data writing to and data reading from the one or more storage devices. Furthermore, there is a data storage network, in which a plurality of the storage systems is connected with each other. In such a data storage network, a host device of a storage system is able to access a storage device of another storage system in the data storage network.

DESCRIPTION OF THE DRAWINGS

FIG. 11 illustrates an example of a block mapping table according to the embodiment.

FIG. 17 is a flow chart showing an example of a local read operation performed by the OS and the storage device of the single storage system.

FIG. 18 is a flow chart showing an example of a remote read operation performed by the local storage system and the remote storage system.

FIGS. 23A and 23B illustrate a flow chart showing another example of the extended copy operation to copy data from a remote storage system to the local storage system.

FIG. 24 is a flow chart showing an example of a garbage collection operation.

DETAILED DESCRIPTION

According to an embodiment, a distributed system includes a plurality of storage systems and a network connecting the storage systems. Each of the storage systems includes a host having a processor and a memory, and a storage device having a controller and a nonvolatile memory. When the controller in a first storage system receives, from a processor of a second storage system, a write command, write data, and size information of the write data, the controller in the first storage system determines an address of the nonvolatile memory of the first storage system in which the write data are to be written, based on the write command and the size information, writes the write data in the nonvolatile memory associated with the address, and transmits the address to the processor of the second storage system, and the processor of the second storage system stores management data indicating correspondence between identification information of the write data and the address in the memory of the second storage system.

Details of the present disclosure are described below with reference to drawings.

[Storage System]

Figure 1:
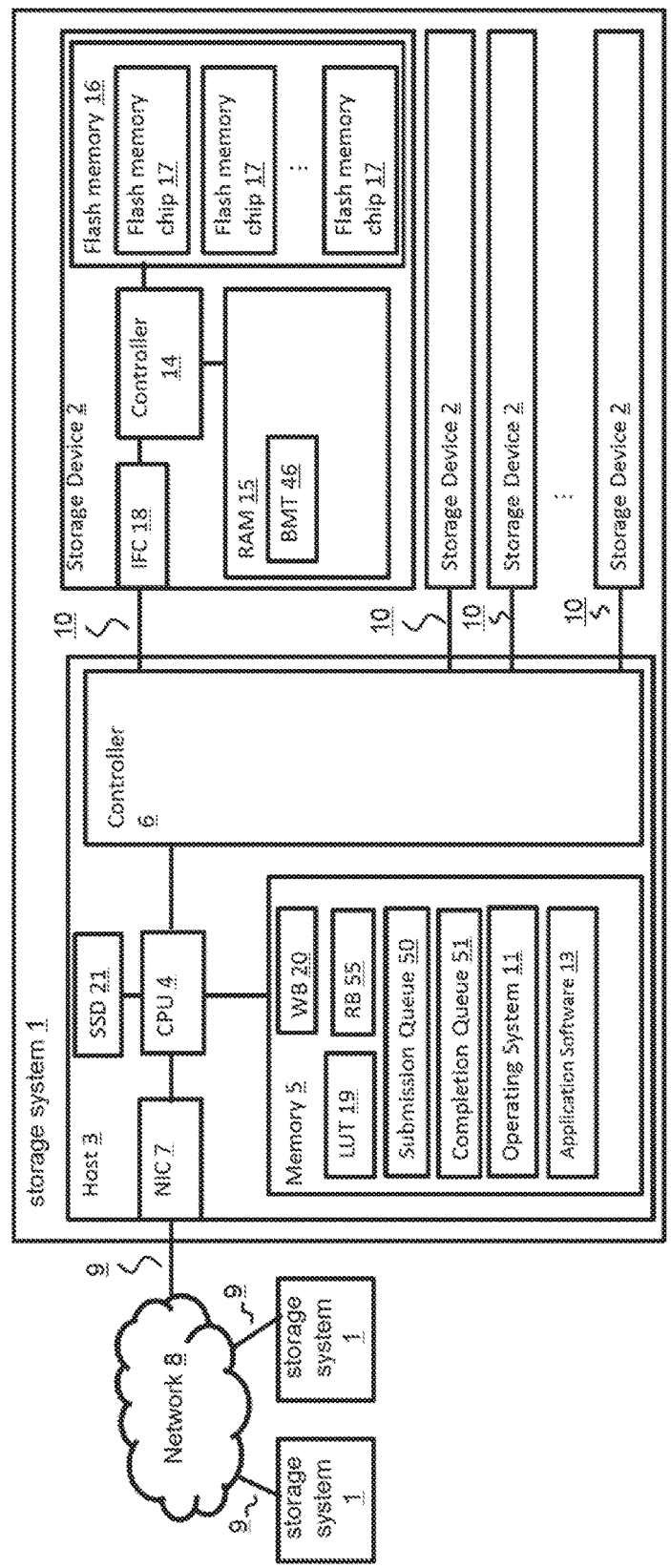
FIG. 1 illustrates a configuration of a plurality of storage systems coupled to each other via a network, according to an embodiment.
Figure 2:
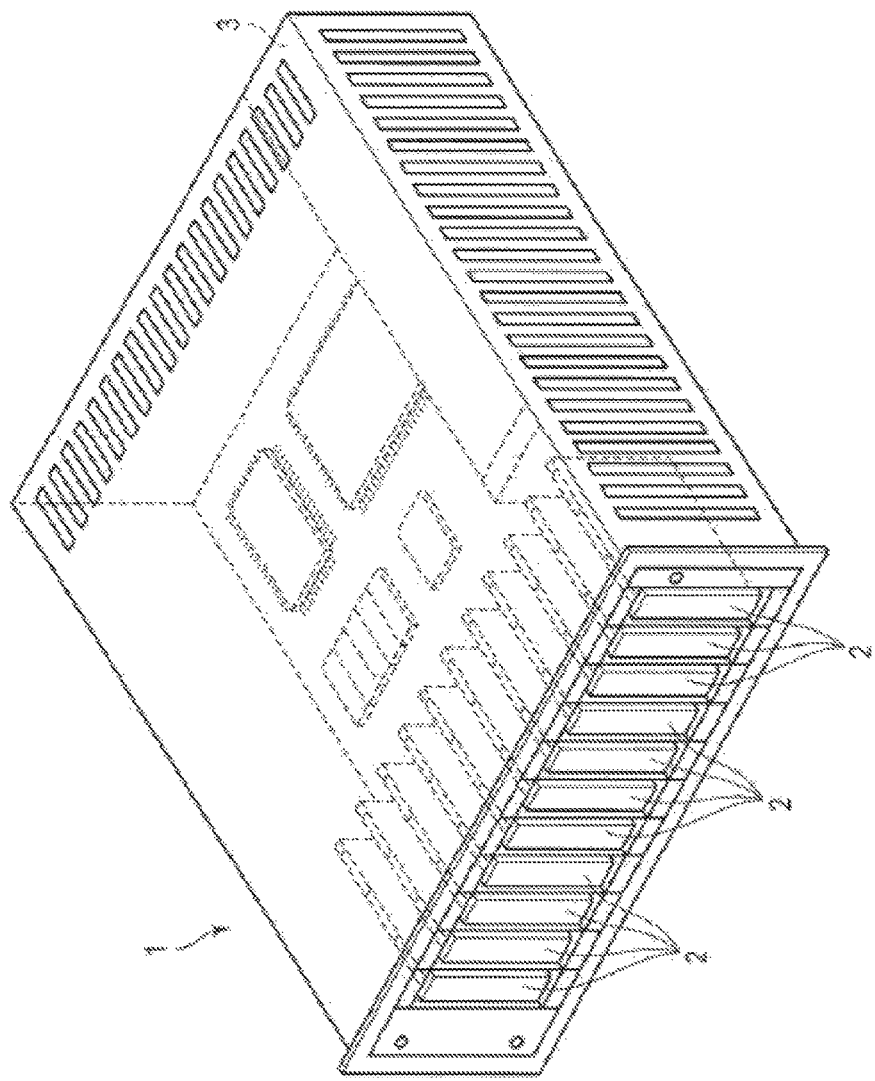
FIG. 2 illustrates a physical structure of the storage system.

FIG. 1 illustrates a configuration of storage systems 1 coupled to each other via a network 8, according to an embodiment. The storage system 1 includes a host 3, one or more storage devices 2, and an interface 10 configured to connect the host 3 and each of the storage devices 2. In the present embodiment, the storage system 1 is a 2U (rack unit) storage appliance shown in FIG. 2. FIG. 2 illustrates a physical structure of the storage system 1 according to the present embodiment. As shown in FIG. 2, a plurality of storage devices 2 and at least one host 3 are packaged in a container. The storage device 2 is a nonvolatile storage device such as a 2.5 inch form factor, 3.5 inch form factor, M.2 form factor or an Add-In Card (AIC) form factor. Further, in the present embodiment, the interface 10 uses PCI Express (Peripheral Component Interconnect Express, PCIe) interface. Alternatively, the interface 10 can use any other technically feasible protocol, such as SAS (Serial Attached SCSI) protocol, USB (Universal Serial Bus), SATA (Serial Advanced Technology Attachment), Thunderbolt (registered trademark), Ethernet (registered trademark), Fibre channel, and the like.

The storage device 2 includes a controller 14, a random access memory (RAM) 15, a non-volatile semiconductor memory, such as a NAND flash memory 16 (hereinafter flash memory 16), and an interface controller (IFC) 18. The IFC 18 is configured to perform transmission and reception of signals to and from the host 3 via the interface 10. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21, such as Toggle and ONFI.

The host 3 includes a CPU 4, a memory 5, a controller 6, Solid State Drive (SSD) 21, and a Network Interface Controller (NIC) 7. The CPU (processing unit) 4 is a central processing unit in the host 3, and performs various calculations and control operations in the host 3. The CPU 4 and the controller 6 are connected by an interface using a protocol such as PCI Express. The CPU 4 performs control of storage device 2 via the controller 6. The controller 6 is a PCIe Switch and a PCIe expander in this embodiment, but, SAS expander, RAID controller, JBOD controller, and the like may be used as the controller 6. The CPU 4 also performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5. The CPU 4 is connected to the NIC 7, which is connected to the network via a network interface 9. The network interface 9 uses a protocol, for example, an Ethernet, InfiniBand, Fibre Channel, PCI Express Fabric, WiFi, and the like.

The memory 5 temporarily stores a program and data and functions as an operational memory of the CPU 4. The memory 5 includes a storage area for storing Operating System (OS) 11, a storage area for storing application software 13A, Write Buffer (WB) 20, Read Buffer (RB) 5, a storage area for storing a Look-up Table (LUT) 19, a storage area for storing Submission Queue 50 and a storage area for storing Completion Queue 51. As is generally known, the OS 11 is a program for managing the entire host 3, such as Linux, Windows Server, VMWARE Hypervisor, and etc., and operates to manage an input to and an output from the host 3, the storage devices 2, and the memory 5, and enable software to use components in the storage system 1, including the storage devices 2. The OS 11 is used to control the manner of data writing to the storage device 2 and data reading from the storage device 2.

The write buffer (WB) 20 temporarily stores write data. The read buffer (RB) 5 temporarily stores read data. The LUT 19 stores mapping between object IDs and physical addresses of the flash memory 16 and the write buffer 20. That is, the host server 3 manages the mapping of data stored in the arrays 1. The submission queue 50 stores, for example, a command or a request with respect to the storage device 2. The completion queue 51 also stores information indicating completion of the command or the request and information related to the completion, when the command or the request sent to the storage device 2.

The SSD 21 is a non-volatile storage device such as a BGA SSD form factor and a M.2 form factor. The SSD 21 stores boot information of the OS 11 and the application 13. The SSD 21 also stores journaling data and back-up data of metadata in the memory 5 such as the LUT 19.

The host 3 sends, to the storage device 2 via the interface 10, a variety of commands for data writing to and data reading from the storage device 2. The commands include a write command, a read command, an invalidate command, a copy command, a monitor command, and the like, as described below in detail.

Figure 3:
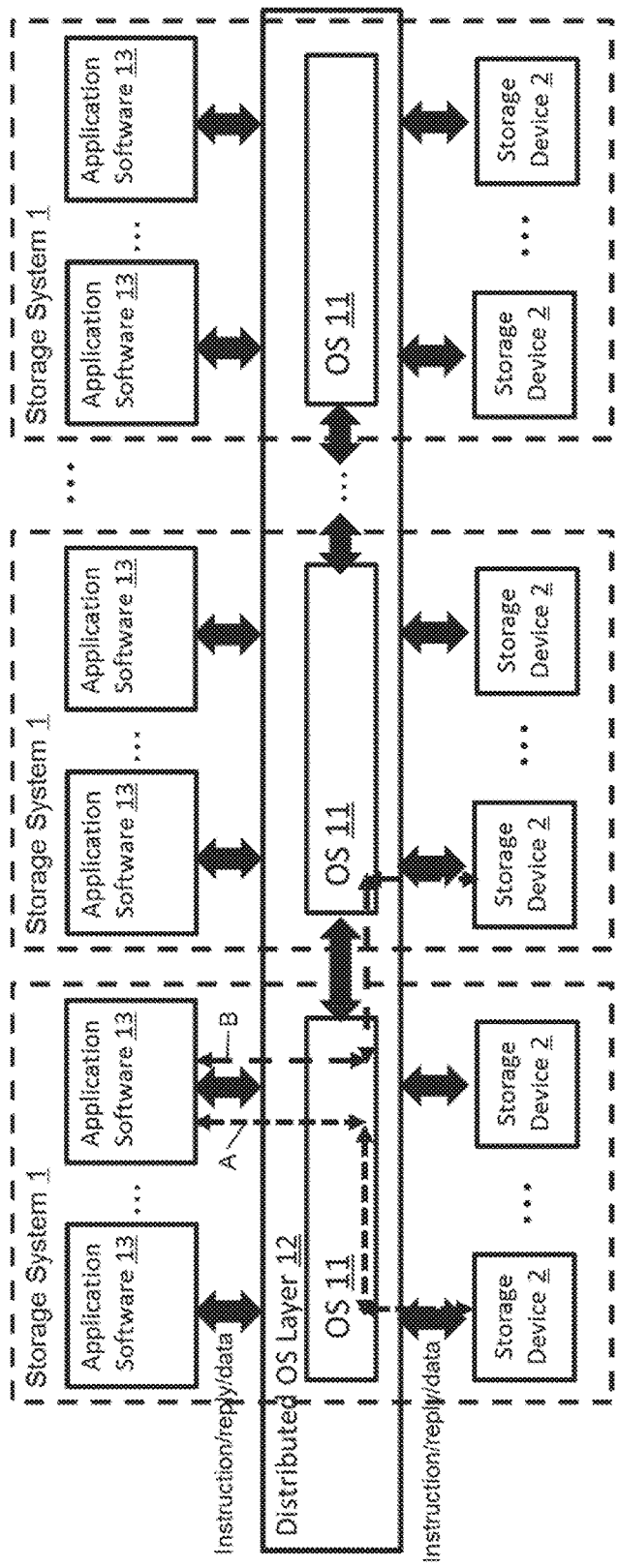
FIG. 3 illustrates a software layer structure of the storage system.

In addition, one or more units of the application software 13 are loaded, respectively, on the memory 5. FIG. 3 illustrates a software layer structure of the storage system 1 according to the present embodiment. Usually, the application software 13 loaded on the memory 5 does not directly communicate with the storage device 2 and instead communicates with the storage device 2 through the OS 11 loaded to the memory 5 (vertical arrows in FIG. 3). The OS 11 of each storage system 1 cooperates together via network 8 (horizontal arrows in FIG. 3). By the plurality of OSs 11 in the plurality of host servers 3 cooperating with each other, the plurality of OSs 11 functions as a single distributed OS layer 12. By the distributed OS layer 12 virtualizing hardware such as the storage device 2, the application software 13 accesses the storage device 2 as software defined storage. According to the access type of the software defined storage realized by the distributed OS layer 12, the application software 13 can access the storage device 2 without considering geographic locations in the storage device 2.

The distributed OS layer 12 manages and virtualizes plural storage devices 2 of plural storage systems 1 so that the application software 13 can access the storage devices 2 transparently. When the application software 13 transmits to the storage device 2 a request, such as a read request or a write request, which is initiated by the host 3, the application software 13 transmits a request to the OS 11, the OS 11 determines which storage system 1 out of storage systems 1 is to be accessed, and then the OS 11 transmits a command, the one or more physical addresses, and data associated with the one or more physical addresses, to the storage device 2 of the determined storage system 1. If the storage system 1 is physically the same storage system 1 of the application software 13 which transmitted the request, the command, the physical addresses, and the data are transmitted via interface 10 (arrow A in FIG. 3). If the storage system 1 is not physically the same storage system 1 of the application software 13 which transmitted the request, the command, the physical addresses, and the data are transmitted via the network 8 and the interface 10 in accordance with Remote Direct Memory Access (RDMA), (arrow B in FIG. 3). Upon receiving a response from the storage device 2, the OS 11 transmits a response to the application software 13.

The application software 13 includes, for example, client software, database software (e.g., Cassandra DB, Mongo DB, HBASE, and etc.), Distributed Storage System (Ceph etc.), Virtual Machine (VM), guest OS, and Analytics Software (e.g., Hadoop, R, and etc.).

[Flash Memory Chip]

Figure 4:
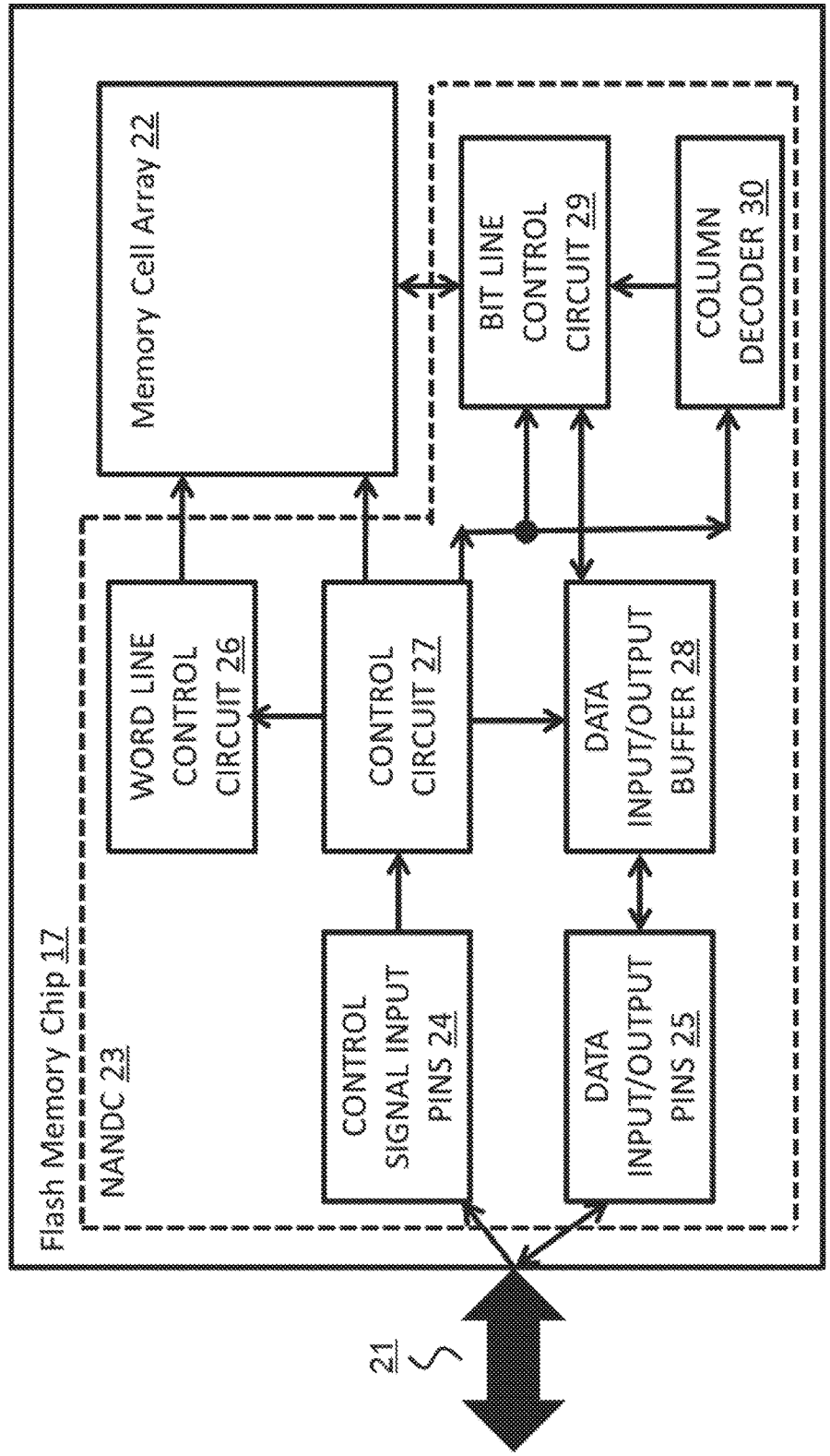
FIG. 4 illustrates a configuration of a flash memory chip in each of storage devices in the storage system.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each stores data, as described below in detail. The NANDC 23 is a controller configured to control access to the memory cell array 22.

Specifically, the NANDC 23 includes signal input pins 24, data input/output pins 25, a word line control circuit 26, a control circuit 27, a data input/output buffer 28, a bit line control circuit 29, and a column decoder 30. The control circuit 27 is connected to the signal input pins 24, the word line control circuit 26, the data input/output buffer 28, the bit line control circuit 29, and the column decoder 30, and entirely controls circuit components of the NANDC 23. Also, the memory cell array 22 is connected to the word line control circuit 26, the control circuit 27, and the data input/output buffer 28. Further, the signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data RD are transferred to the controller 14 of the storage device 2 from the data input/output pins 25 through the flash interface 21. When data are written to the flash memory chip 17, data to be written (write data WD) are input to the data input/output buffer 28 through the data input/output pins 25. Then, the write data WD are transferred to the column decoder 30 through the control circuit 27, and input to the bit line control circuit 29 by the column decoder 30. The write data WD are written to memory cells of the memory cell array 22 with a timing controlled by the word line control circuit 26 and the bit line control circuit 29.

When control signals CS are input to the flash memory chip 17 from the controller 14 of the storage device 2 through the flash interface 21, the control signals CS are input through the control signal input pins 24 into the control circuit 27. Then, the control circuit 27 generates control signals CS', according to the control signals CS from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
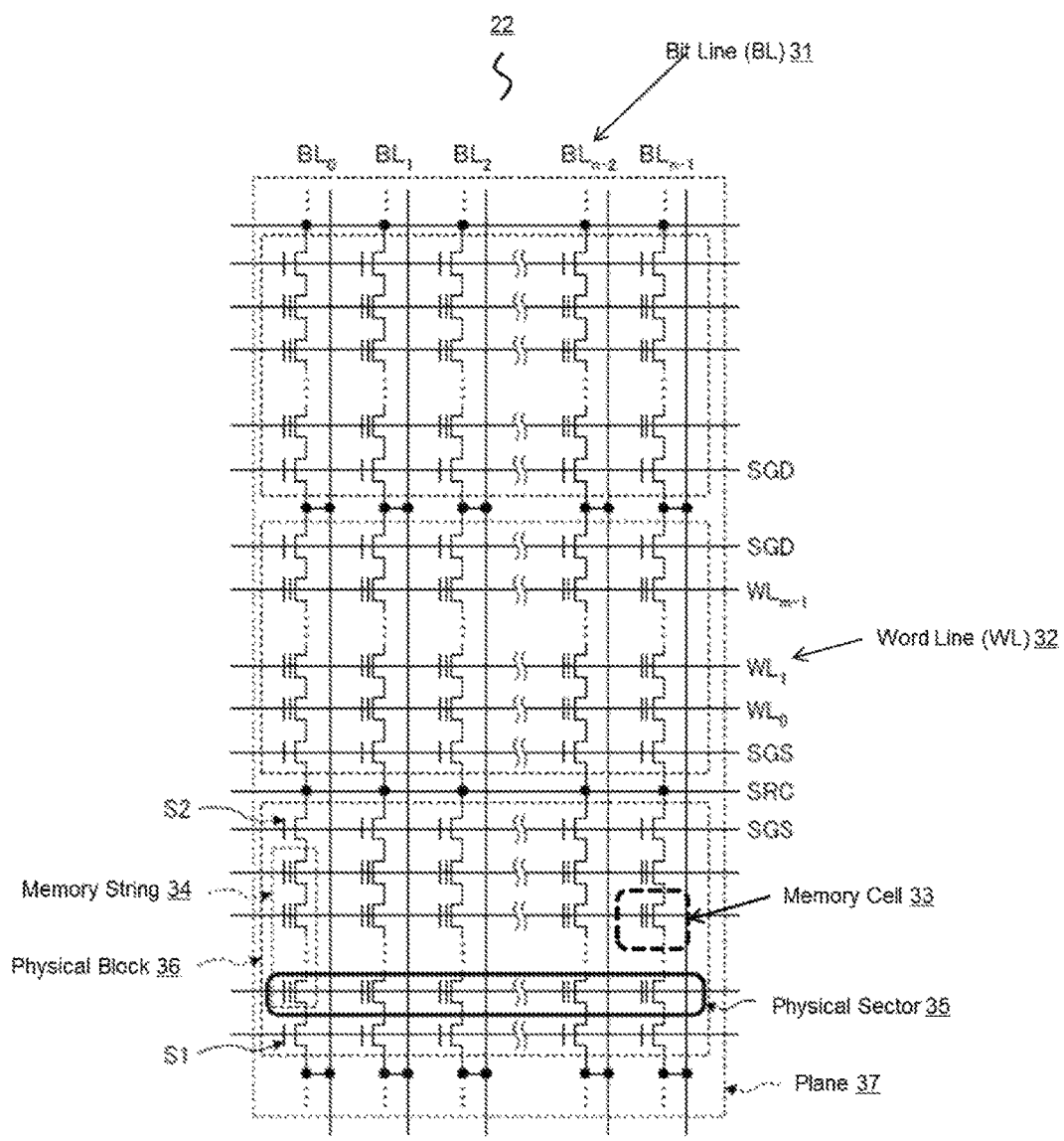
FIG. 5 illustrates a detailed circuit structure of a memory cell array in the flash memory chip.

FIG. 5 illustrates detailed circuit structure of the memory cell array 22. The memory cell array 22 includes one or more planes 37, each plane 37 includes a plurality of physical blocks 36, and each physical block 36 includes a plurality of memory strings 34. Further, each of the memory strings (MSs) 34 includes a plurality of memory cells 33.

The Memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each MS 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm-1. First selection gates 51 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation, a read operation, and a program verify operation, one word line WL is selected according to a physical address, such as a Row Address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are allocated to the physical sector 35, as physical pages. A physical address comprises physical page addresses and physical block address. A physical page address is assigned to each of the physical pages, and a physical block address is assigned to each of the physical blocks 36.

Figure 6:
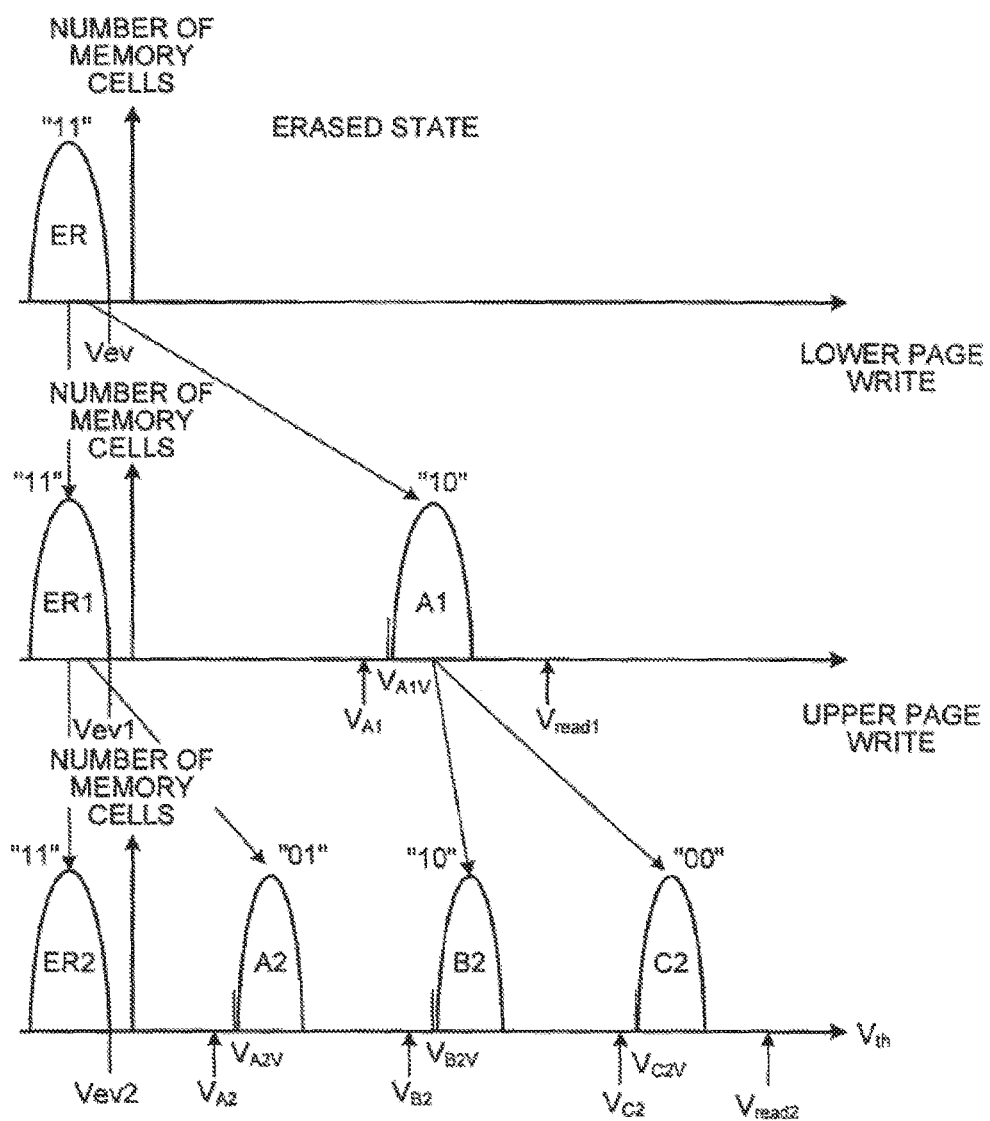
FIG. 6 illustrates a relation between 2-bit four-level data (data "11", "01", "10", and "00") stored in a memory cell of a four-level NAND cell type and a threshold voltage distribution of each level.

The four-level NAND memory of 2 bit/cell is configured such that a threshold voltage in one memory cell could have four kinds of distributions. FIG. 6 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, i.e., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data according to difference in the threshold voltage.

In the present embodiment, each of the memory cells 33 employs a write system of a four-level store method for 2 bit/cell (MLC), using an upper page and a lower page. Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S. Pat. No. 8,189,391, U.S. Patent Application Publication No. 2010/0207195, and U.S. Patent Application Publication No. 2010/0254191.

[Storage Device]

Figure 7:
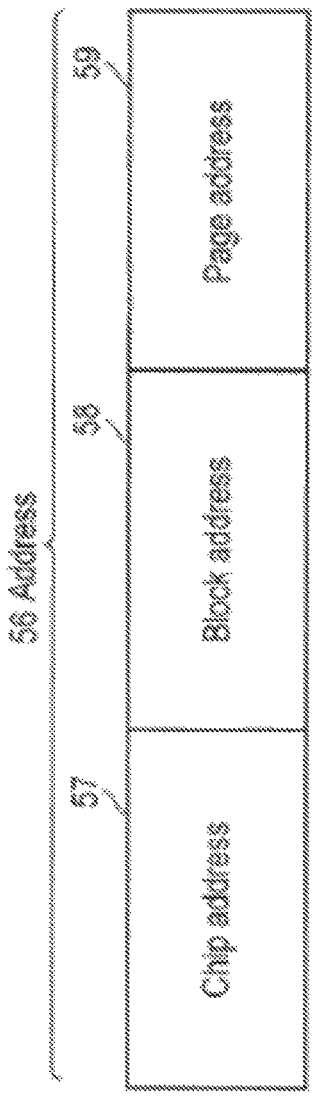
FIG. 7 illustrates a first example of an address structure according to the present embodiment.

FIG. 7 illustrates a first example of the address structure 56 according to the present embodiment. Physical addresses are transmitted via interface 10 as a form of address structure 56. Address structure 56 includes chip address 57, block address 58 and page address 59. In the present embodiment, the chip address 57 is located at MSB (most significant bit) of the address structure 56, and the page address 59 is located at LSB (least significant bit) of the address structure 56, as shown in FIG. 7. The locations of the chip address 57, the block address 58, and the page address 59 can be determined arbitrarily.

Figure 8:
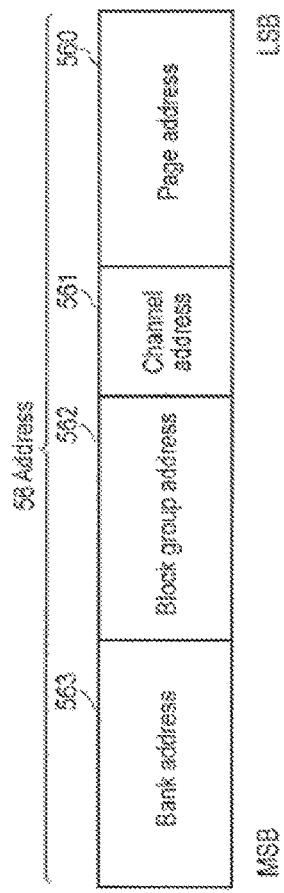
FIG. 8 illustrates a second example of the address structure according to the present embodiment.

FIG. 8 illustrates a second example of the address structure 56 according to the present embodiment. The address 56 includes a bank address 563, a block group address 562, a channel address 561, and a page address 560. The bank address 563 corresponds to the chip address in FIG. 7. The block group address 562 corresponds to the block address 58 in FIG. 7. The channel address 561 and the page address 560 correspond to the page address 59 in FIG. 7.

Figure 9:
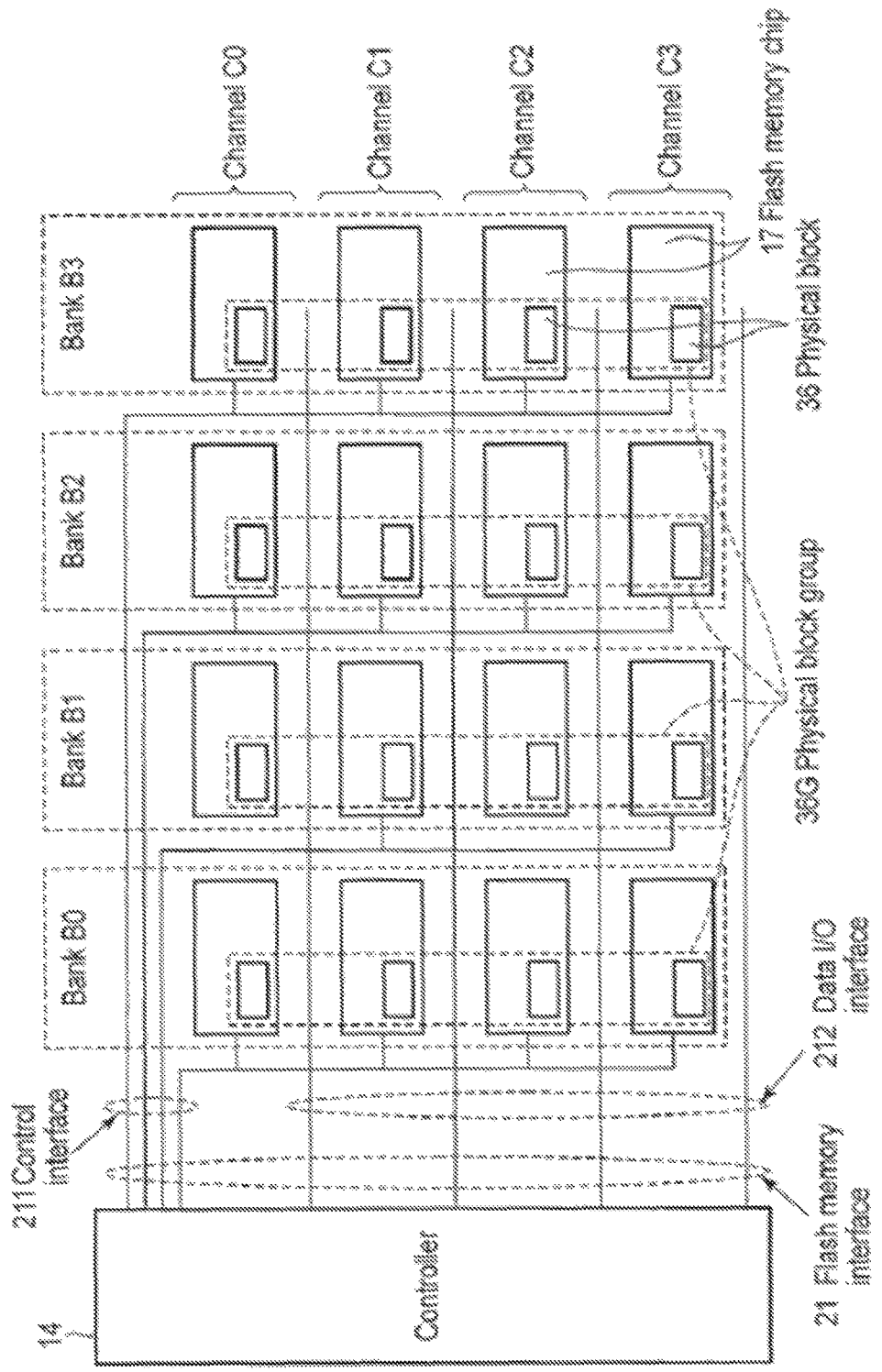
FIG. 9 illustrates a third example of an address structure according to the present embodiment.

FIG. 9 is a block diagram of a configuration of the non-voluntary memory according to the present embodiment. FIG. 9 illustrates elements corresponding to each of the addresses shown in FIG. 8. In FIG. 9, the plurality of flash memory chips 17 are specified by channel groups C0-C3 and bank groups B0-B3, which intersect with each other. The flash memory interface 21 between the controller 14 and the flash memory chip 17 includes a plurality of data I/O interfaces 212 and a plurality of control interfaces 211. Flash memory chips 17 that share a common data I/O interface 212 belong to a common channel group. Similarly, flash memory chips 17 that share a common bus of the control interface 211 belong to a common bank group.

According to this sharing of the bus, a plurality of flash memory chips 17 that belong to the same bank group can be accessed in parallel through driving of the plurality of channels. Also, the plurality of banks can be operated in parallel through an interleave access. The controller 14 fetches, from the submission queue 50, a command to access a bank in an idle state in priority to a command to access a busy bank, in order to perform a more efficient parallel operation. Physical blocks 36 that belong to the same bank and are associated with the same physical block address belong to the same physical block group 36G, and assigned a physical block group address corresponding to the physical block address.

Figure 10:
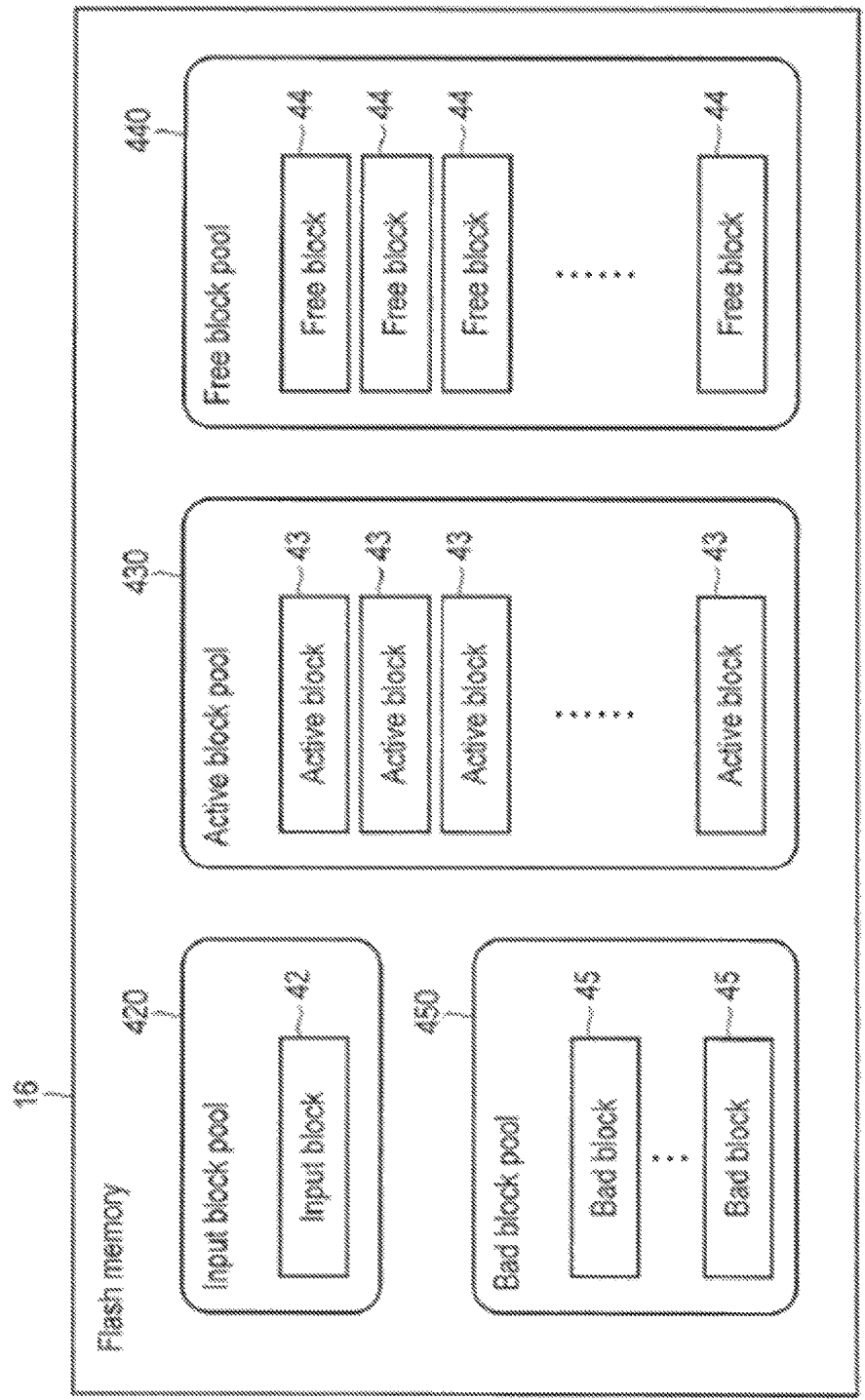
FIG. 10 illustrates an overview of mapping of physical blocks based on block pools in the embodiment.

FIG. 10 is a block diagram illustrating an overview of the mapping of the physical blocks based on the block pools of the first embodiment. The block pools include a free block pool 440, an input block pool 420, an active block pool 430, and a bad block pool 450. The mappings of physical blocks are managed by controller 14 using block mapping table (BMT) 46. The controller 14 maps each of the physical blocks 36 to any of the block pools, in the BMT 46.

The free block pool 440 includes one or more free blocks 44. The free block 44 is a block that does not store valid data. That is, all data stored in the free block 44 are invalidated.

The input block pool 420 includes an input block 42. The input block 42 is a block in which data are written. The input block 42 may store no data, if data therein have been erased, or include a written region that stores data and an unwritten region in which data can be written.

The input block 42 is generated from a free block 44 in the free block pool 440. For example, a free block 44 that has been subjected to erasing operations the smallest number of times may be selected as a target block to be changed to the input block 42. Alternatively, a free block 44 that has been subjected to erasing operations less than a predetermined number of times may be selected as the target block.

The active block pool 430 includes one or more active blocks 43. The active block 43 is a block that no longer has a writable region (i.e., becomes full of valid data).

The bad block pool 450 includes one or more bad blocks 45. The bad block 45 is a block that cannot be used for data writing, for example, because of defects.

FIG. 11 illustrates an example of the BMT 46 according to the present embodiment. The BMT46 includes a free block table 461, an active block table 462, a bad block table 463, and an input block table 464. The BMT 46 manages a physical block address list of the free blocks 44, the input block 42, the active blocks 43, and the bad blocks 45, respectively. Other configurations of different types of block pools may be also managed in the BMT 46.

The input block table 464 also manages a physical page address to be written (PATBW) which next data will be written of each input block 42. When the controller 14 maps a block from the free block pool 440 as the input block 42, the controller 14 removes a block address of the block from the free block table 461, adds an entry including the block address and PATBW=0 to the input block table 464.

When the controller 14 processes a write operation of data to the input block 42, the controller 14 identifies a PATBW by referring to the input block table 464, writes the data to the page address in the input block 42, and increments the PATBW in the input block table 464 (PATBW=PATBW+ written data size). When the PATBW exceeds maximum page address of the block, the controller 14 re-maps the block from the input block pool 420 as the active block pool 430.

[Local Write Operation]

Figure 12:
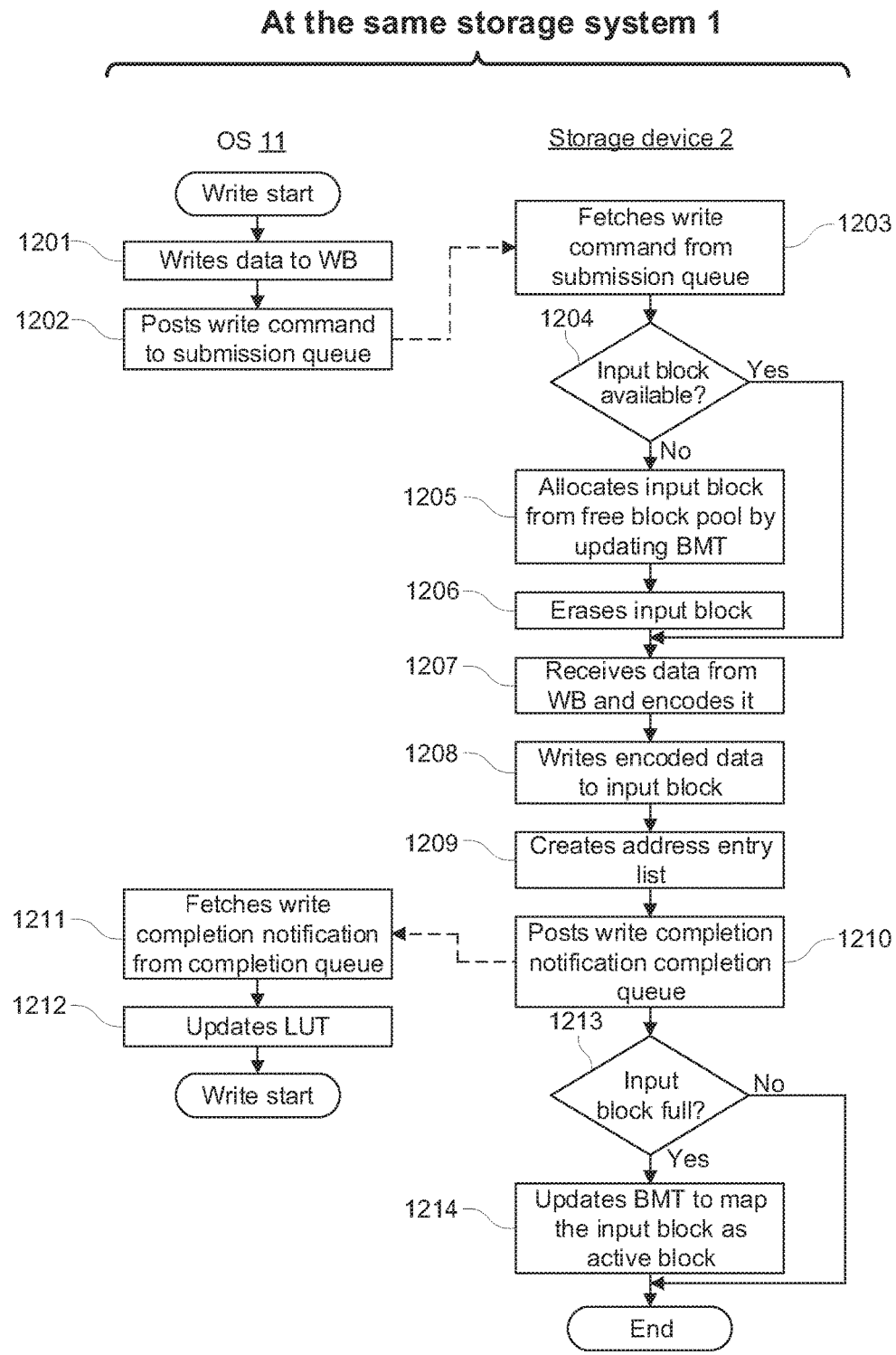
FIG. 12 is a flow chart showing an example of a local write operation performed by OS in a host and a storage device of a single storage system.

FIG. 12 is a flow chart showing an example of a local write operation performed by the OS 11 and the storage device 2 of the same storage system 1. In the local write operation, the OS 11 accesses the storage device 2 via the interface 10 without using the network 8.

In step 1201, the OS 11 stores write data in the write buffer 20 of the host 3. Instead of storing the write data, a pointer indicating a region of the memory 5 in which the write data has been already stored may be stored in the write buffer 20 of the host 3.

In step 1202, the OS 11 posts a write command to the submission queue 50 in the host 3. The OS 11 includes a size of data to be written in the write command 40, but does not include an address in which data are to be written, in the write command.

In step 1203, the controller 14 fetches the write command from the submission queue 50 via the interface 10.

In step 1204, the controller 14 determines whether or not the input block 42 is available for storing the write data. If the input block 42 is determined to be not available (No in step 1204), the process proceeds to step 1205. If the input block 42 is determined to be available (Yes in step 1204), the process proceeds to step 1207.

In step 1205, the controller 14 assigns (remaps) the input block 42 from the free block pool 440 by updating the BMT 46.

In step 1206, the controller 14 erases data stored in the assigned input block 42.

In step 1207, the controller 14 receives the write data from the write buffer memory 20 via the interface 10 and encodes the write data.

In step 1208, the controller 14 identifies a page address of the input block 42 in which the write data are to be written by referring the BMT 46, and writes the encoded data to the identified page address of the input block 42.

In step 1209, the controller 14 creates an address entry list which includes the physical address of the flash memory chip 17 in which the write data have been written in this write operation.

In step 1210, the controller 14 posts a write completion notification including the address entry list to the completion queue 51 via the interface 10. Instead of posting an address entry list in the completion notification, the controller 14 may post a pointer containing the address entry list.

In step 1211, the OS 11 fetches the write completion notification from the completion queue 51.

In step 1212, the OS 11 updates the LUT 19 to map an object ID of the write data to the written physical address or addresses.

In step 1213, the controller 14 determines whether or not the input block 42 becomes full. If the input block 42 is determined to become full (Yes in step 1213), in step 1214, the controller 14 updates the BMT 46 to remap the input block 42 as the active block 43. If the input block 42 is determined to not become full (No in step 1213), then the process ends.

Figure 13:
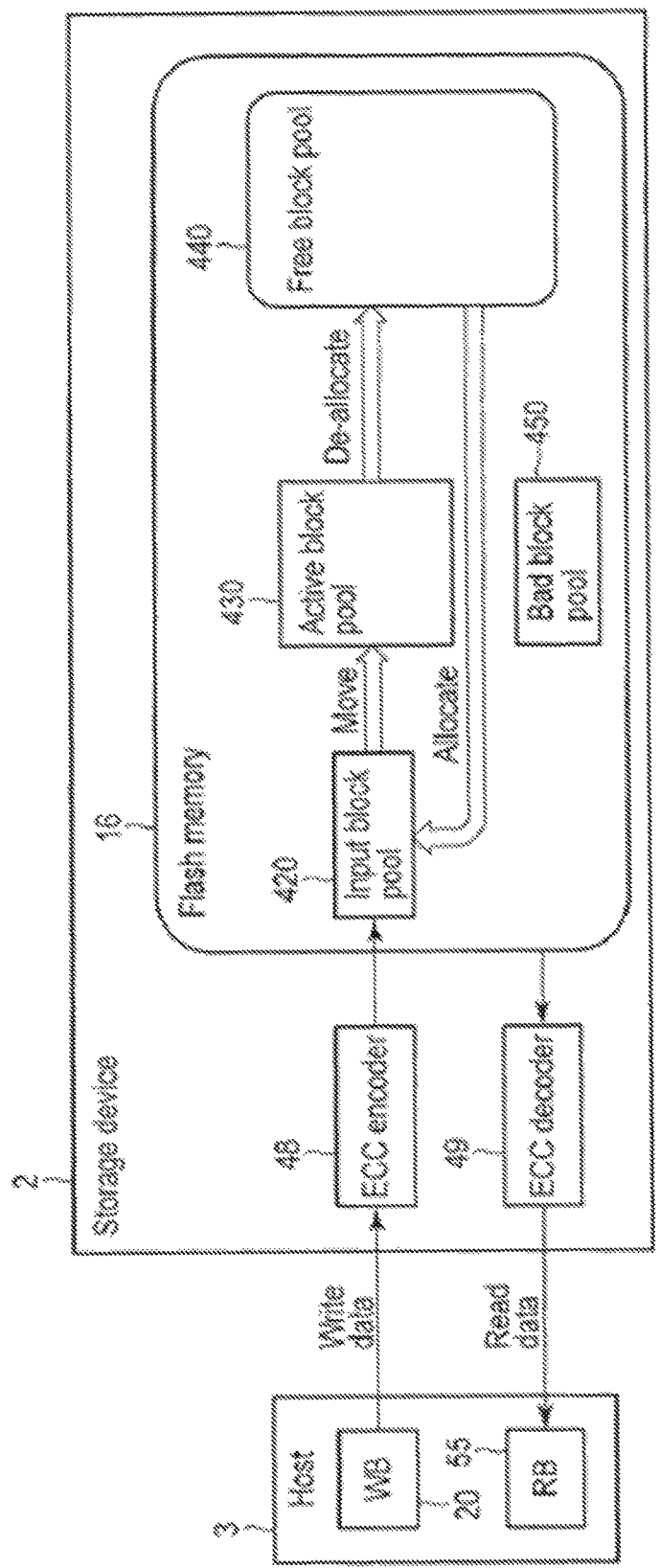
FIG. 13 illustrates a first example of an architecture overview of the storage device for the write operation.

FIG. 13 illustrates a first example of an architecture overview of the storage device 2 of the first embodiment for the write operation, during which the controller 14 writes the write data from the write buffer memory 20 to the flash memory 16. The physical block 36 belongs to any of the input block pool 420, the active block pool 430, the free block pool 440, or the bad block pool 450.

The controller 14 receives the write data from the write buffer memory 20 via the interface 10 and encodes the write data using an ECC encoder 48 in the controller 14. Also, the controller 14 decodes read data using an ECC decoder 49 in the controller 14.

When the controller 14 writes the write data from the write buffer memory 20 to the flash memory 16, the controller 14 looks up physical addresses of pages in the input block 42 of the input block pool 420 to be written by referring to the BMT 46. When there is no available input block 42 in the flash memory 16, the controller 14 assigns (remaps) a new input block 42 from the free block pool 440. When no physical page in the input block 42 is available for data writing without erasing data therein, the controller 14 remaps the block as the active block pool 430. Also, the controller 14 de-allocates a block of the active block pool 430 to the free block pool 440.

Figure 14:
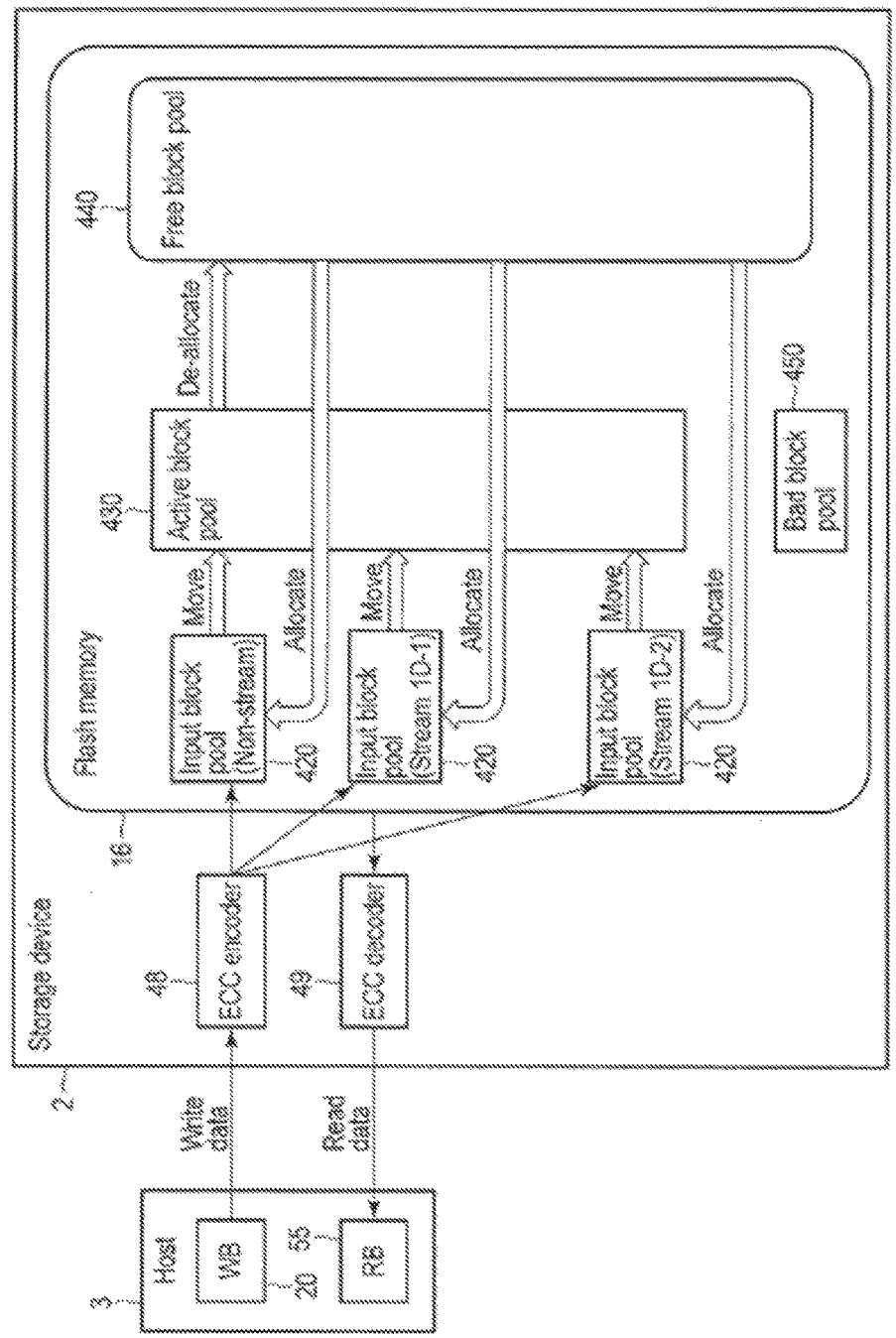
FIG. 14 illustrates a second example of the architecture overview of the storage device for the write operation.

FIG. 14 illustrates a second example of the architecture overview of the storage device 2 for the write operation. In this architecture, a stream ID is used as hinting information for write operation to separate different types of data into different physical blocks 36, two or more input blocks 42 of two or more input block pools 420 for data writing are prepared with respect to each stream ID, and write data associated with a certain stream ID are stored in a physical block associated with the stream ID. The write command includes the stream ID as another parameter in this example. When the OS 11 posts the write command specifying the stream ID to the submission queue 50, the controller 14 writes the write data from the write buffer memory 20 to the input block 42 corresponding to the specified stream ID. When the OS 11 posts the write command which does not specify the stream ID to the submission queue 50, the controller 14 writes the write data from the write buffer memory 20 to the input block 42 corresponding to non-stream group. By storing the write data in accordance with the stream ID, the type of data (or lifetime of data) stored in the physical block 36 can be uniform, and as a result, it is possible to increase a probability that the data in the physical block can be deleted without transferring part of the data to another physical block 36 when the a garbage collection process is performed.

Figure 15:
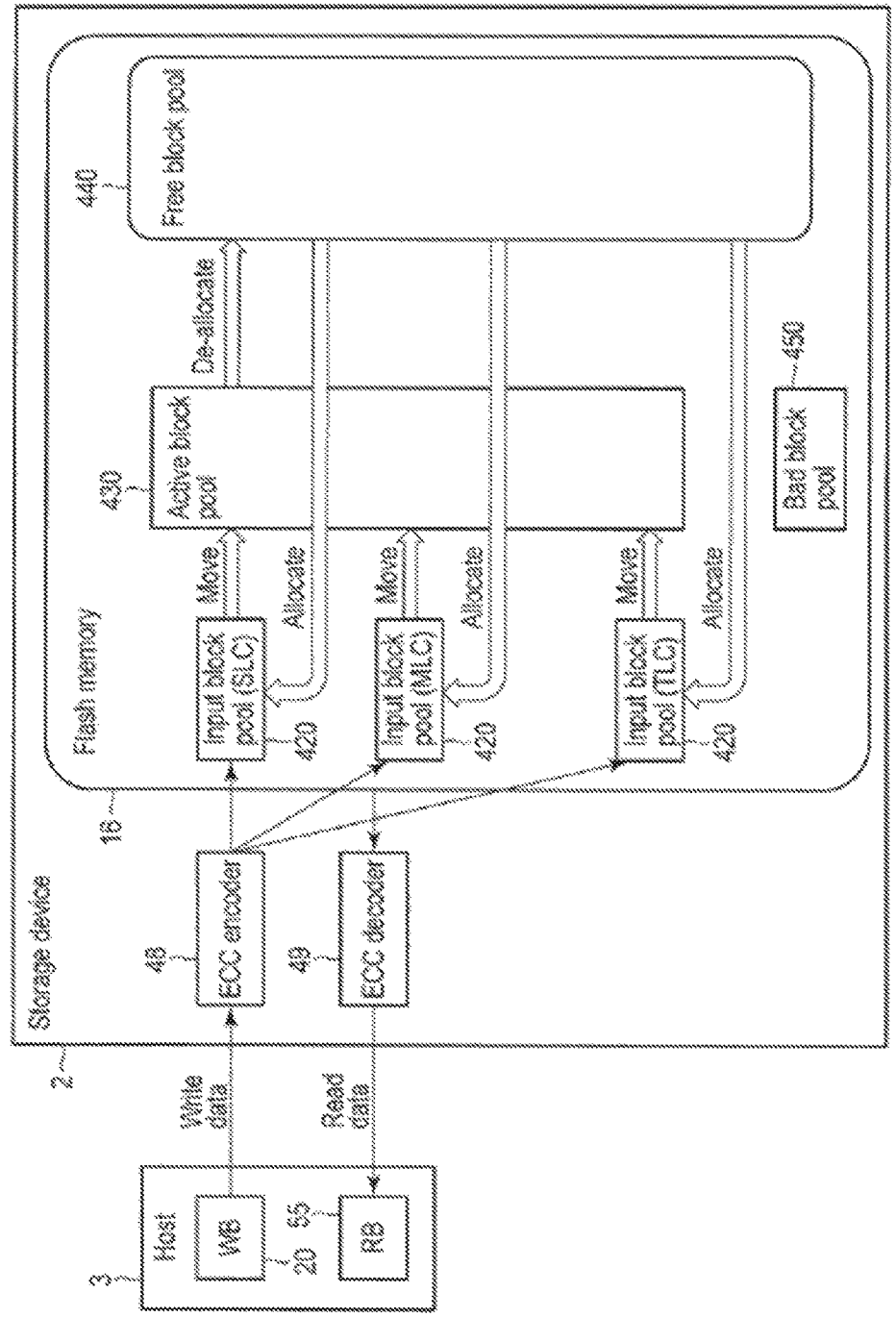
FIG. 15 illustrates a third example of the architecture overview of the storage device for the write operation.

FIG. 15 illustrates a third example of the architecture overview of the storage device 2 for the write operation. In this architecture, two or more input blocks 42 for writing data are prepared with respect to n bit/cell write system, and the write data are stored in the physical block 36 in one of SLC, MLC, and TLC manner. The write command includes a bit density (BD) as another parameter in this example. When the OS 11 posts the write command specifying BD=1 to the submission queue 50, the controller 14 writes the write data from the write buffer memory 20 to the input block 42 in 1 bit/cell manner (SLC). When the OS 11 posts the write command specifying BD=2 to the submission queue 50, the controller 14 writes the write data from the write buffer memory 20 to the input block 42 in 2 bit/cell manner (MLC). When the OS 11 posts the write command specifying BD=3 to the submission queue 50, the controller 14 writes the write data from the write buffer memory 20 to the input block 42 in 3 bit/cell manner (TLC). When the OS 11 posts the write command specifying BD=0 to the submission queue 50, the controller 14 writes the write data from the write buffer memory 20 to the input block 42 in default manner which is one of SLC, MLC, and TLC. Writing data by SLC manner has highest write performance and highest reliability, but has lowest data density. Writing data by MLC manner has highest data density, but has lowest write performance and lowest reliability. According to this example, the OS 11 can manage and control a write speed, density, and reliability of the input block 420 by controlling bit density.

[Remote Write Operation]

Figure 16A:
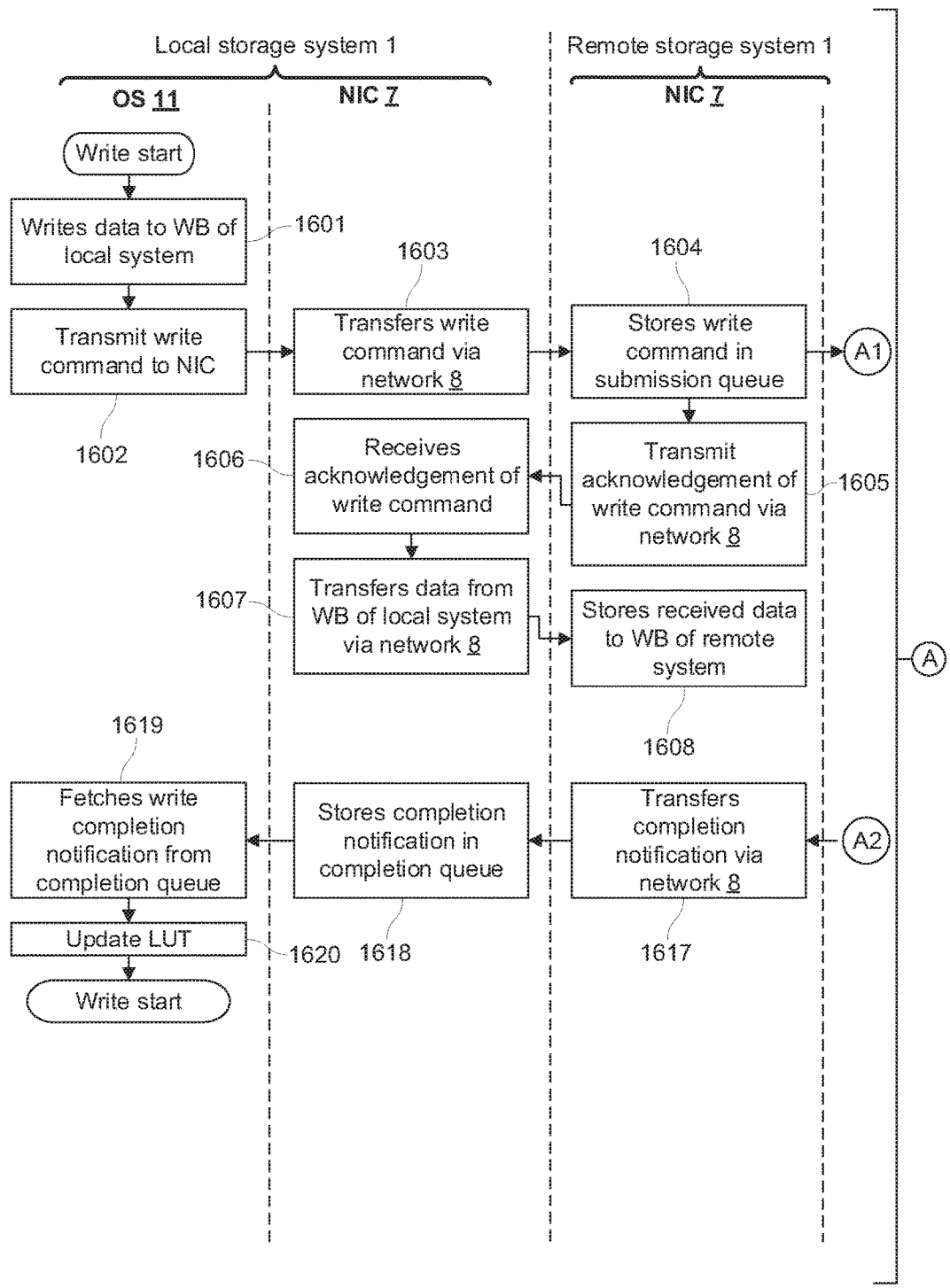
FIGS. 16A and 16B illustrate a flow chart showing an example of a remote write operation performed by a local storage system and a remote storage system.
Figure 16B:
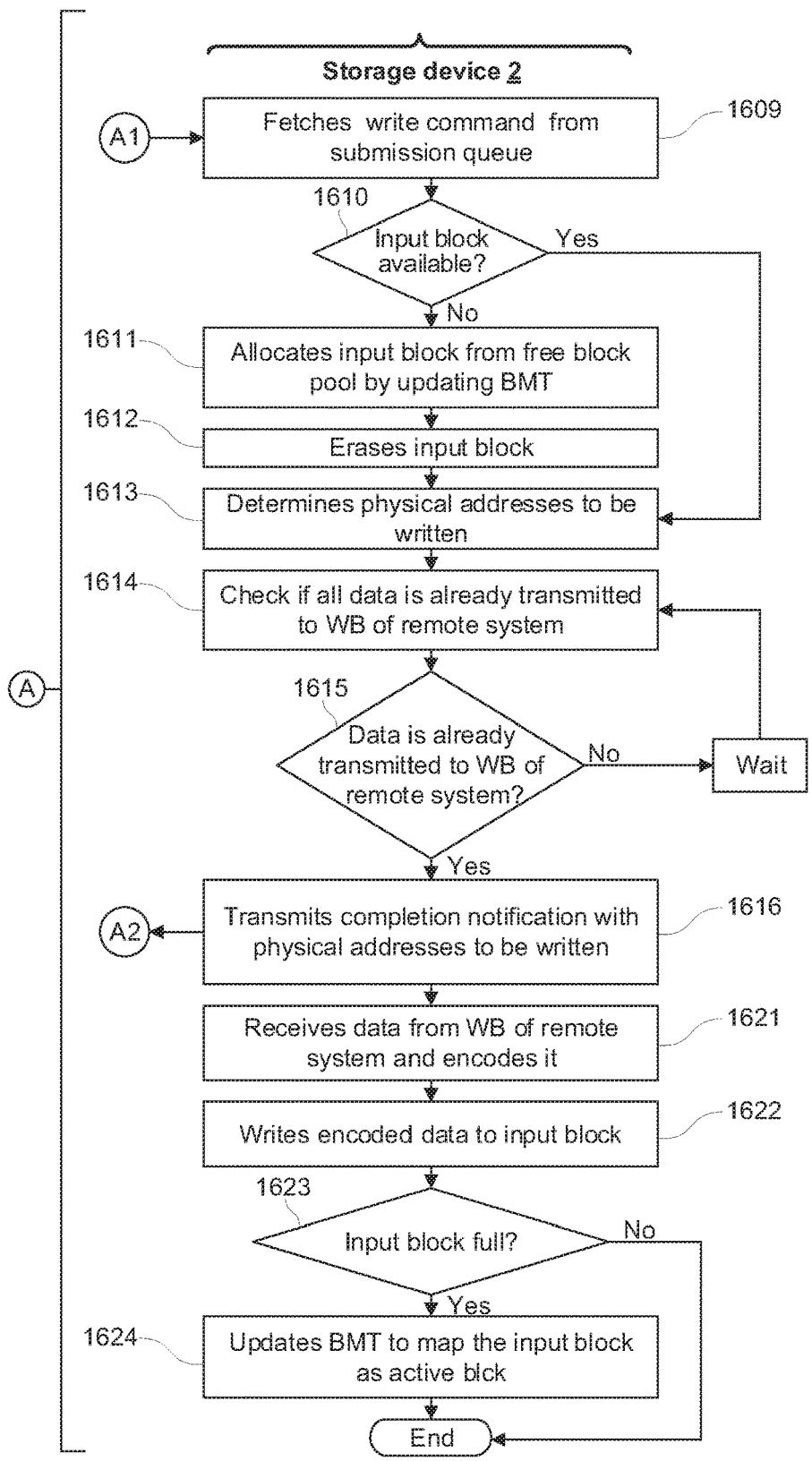

FIGS. 16A and 16B illustrate a flow chart showing an example of a remote write operation performed by the OS 11, and storage device 2 that is located at a storage system 1 (remote storage system 1) which is physically (geographically) different from the storage device of the OS11 which transmits a write request (local storage system 1). In the remote write operation, the OS 11 accesses the storage device 2 via the network 8 and the interface 10.

In step 1601, the OS 11 stores the write data in the write buffer memory 20 of the local storage system 1. Instead of storing the write data, the OS 11 may store a pointer indicating a region of the memory 5 in which the write data has been already stored may be stored in the write buffer 20.

In step 1602, the OS 11 transmits a write command to the NIC 7 of local storage system 1, and the NIC 7 of the local storage system 1 transfers the write command to the NIC 7 of the remote storage system 1 via the network 8. The write command contains a size of data to be written, but does not contain an address of the memory chip 17 in which data are to be written.

In step 1604, the NIC 7 of the remote storage system 1 receives the write command via the network 8 and stores the write command in the submission queue 50 of the remote storage system 1. In step 1605, the NIC 7 of the remote storage system 1 transmits an acknowledgement of the write command to the NIC 7 of the local storage system via the network 8. In response, in step 1607, the NIC 7 of the local storage system transmits data to be written (write data) from the WB 20 of the local storage system 1 to the NIC 7 of the remote storage system 1 via the network 8. In step 1608, the NIC 7 of the remote storage system 1 stores the write data in the WB 20 of the remote storage system 1.

In step 1609, the controller 14 of the remote storage system 1 fetches the write command from the submission queue 50 of the remote storage system 1 via the interface 10. In step 1610, the controller 14 determines whether or not the input block 42 is available for storing the write data. If the input block 42 is determined to be not available (No in step 1610), the process proceeds to step 1611. If the input block 42 is determined to be available (Yes in step 1610), the process proceeds to step 1613.

In step 1611, the controller 14 assigns (remaps) the input block 42 from the free block pool 440 by updating the BMT 46. In step 1612, the controller 14 erases data stored in the assigned input block 42. Step 1612 may be performed after step 1621.

In step 1613, the controller 14 determines physical addresses (chip address, block address, and page address) of the flash memory 16 in which the write data are to be written.

In steps 1614 and 1615, the controller 14 waits until all write data are transmitted from the local storage system 1 to the WB 20 of the remote storage system.

In step 1616, the controller 14 transmits completion notification and the physical addresses which were determined above to the NIC 7 of the remote storage system 1. Then, in step 1617, the NIC 7 of the remote storage system 1 transfers them to the NIC 7 of the local storage system 1. In response, in step 1618, the NIC 7 of the local storage system 1 stores the completion notification and the physical addresses in the completion queue 51 of the local storage system 1. Instead of storing the addresses in the completion notification, the NIC 7 may store a pointer which points a location in which the addresses are stored in the memory 5 of the local storage system 1.

In step 1619, the OS 11 fetches the write completion notification from the completion queue 51. In step 1620, the OS 11 updates the LUT 19 to map a file ID or an object ID of the write data to the written physical address or addresses of the flash memory 16 in the remote storage system 1.

In step 1621, the controller 14 receives the write data from the WB 20 of the remote storage system 1 via the interface 10 and encodes the write data. In step 1622, the controller 14 writes the encoded data to the determined physical addresses of the input block 42.

In step 1623, the controller 14 determines whether or not the input block 42 becomes full. If the input block 42 is determined to become full (Yes in step 1623), in step 1624, the controller 14 updates the BMT 46 to remap the input block 42 as the active block 43. If the input block 42 is determined to not become full (No in step 1623), then the process ends.

[Local Read Operation]

FIG. 17 is a flow chart showing an example of a local read operation performed by the OS 11 and the storage device 2 of the same storage system 1. In the local read operation, the OS 11 accesses the storage device 2 via the interface 10 without using the network 8.

In step 1701, the OS 11, by referring to the LUT 19, converts a file ID or an object ID of data to be read to one or more physical addresses 56 from which the data are to be read.

In step 1702, the OS 11 posts a read command to the submission queue 50 in the host 3. The OS 11 includes address entries which includes the physical addresses 56 and a size of the data to be read in the read command.

In step 1703, the controller 14 fetches the read command from the submission queue 50 via the interface 10.

In step 1704, the controller 14 reads the data (read data) from the physical addresses 56 of the flash memory 16 without converting the physical addresses 56 (without address conversion by a Flash Translation Layer (FTL)).

In step 1705, the controller 14 decodes the read data using the ECC decoder 49 in the controller 14.

In step 1706, the controller 14 transmits the decoded data to the read buffer memory 55 via the interface 10.

In step 1707, the controller 14 posts a read completion notification to the completion queue 51 via the interface 10.

In step 1708, the OS 11 fetches the read completion notification from the completion queue 51.

In step 1709, the OS 11 reads the read data from the read buffer memory 55.

Instead of reading the read data from the read buffer memory 55, the OS 11 may refer to a pointer indicating the read data in the read buffer memory 55.

[Remote Read Operation]

FIG. 18 is a flow chart showing an example of a remote read operation performed by the OS 11 of the local storage system 1 and the storage device 2 of the remote storage system 1, which is physically different from the local storage system 1. In the remote read operation, the OS 11 accesses the storage device 2 of the remote storage system 1 via the network and the interface 10.

In step 1801, the OS 11, by referring to the LUT 19, converts a File ID or an object ID of data to be read to one or more physical addresses 56 of the flash memory 16 from which the data are to be read.

In step 1802, the OS 11 transmits a read command to the NIC 7 of the local storage system 1. Then, in step 1803, the NIC 7 of the local storage system 1 transfers the read command to the NIC 7 of the remote storage system 1 via the network 8. In response, in step 1804, the NIC 7 of remote storage system 1 stores the read command in the submission queue 50 of the remote storage system 1. The read command contains address entries which includes the physical addresses 56 from which the data are to be read and a size of the data to be read.

In step 1805, the controller 14 of the remote storage system 1 fetches the read command from the submission queue 50 via the interface 10.

In step 1806, the controller 14 reads data (read data) from the physical addresses 56 of the flash memory 16 without converting the physical addresses 56 (without the address conversion by FTL).

In step 1807, the controller 14 decodes the read data using the ECC decoder 49 in the controller 14.

In step 1808, the controller 14 transmits the decoded data to the NIC 7 of the remote storage system 1 via the interface 10. Then, in step 1809, the NIC 7 of remote storage system 1 transfers the read data to the NIC 7 of the local storage system 1 via the network 8. In response, in step 1810, the NIC 7 of the local storage system 1 stores the read data in the RB 55 of the local storage system 1.

Further, in step 1811, the controller 14 transfers a read completion notification to the NIC 7 of the remote storage system 1 via the interface 10. Then, in step 1812, the NIC 7 of the remote storage system 1 transfers the notification to the NIC 7 of local storage system 1 via the network 8. In response, in step 1813, the NIC 7 of the local storage system 1 stores the notification in the completion queue 51 of the local storage system 1.

In step 1814, the OS 11 fetches the read completion notification from the completion queue 51. The OS 11 reads the read data from the read buffer memory 55. Instead of reading the read data from the read buffer memory 55, the OS 11 may refer to a pointer indicating the read data in the read buffer memory 55.

[Local Invalidation Operation]

Figure 19:
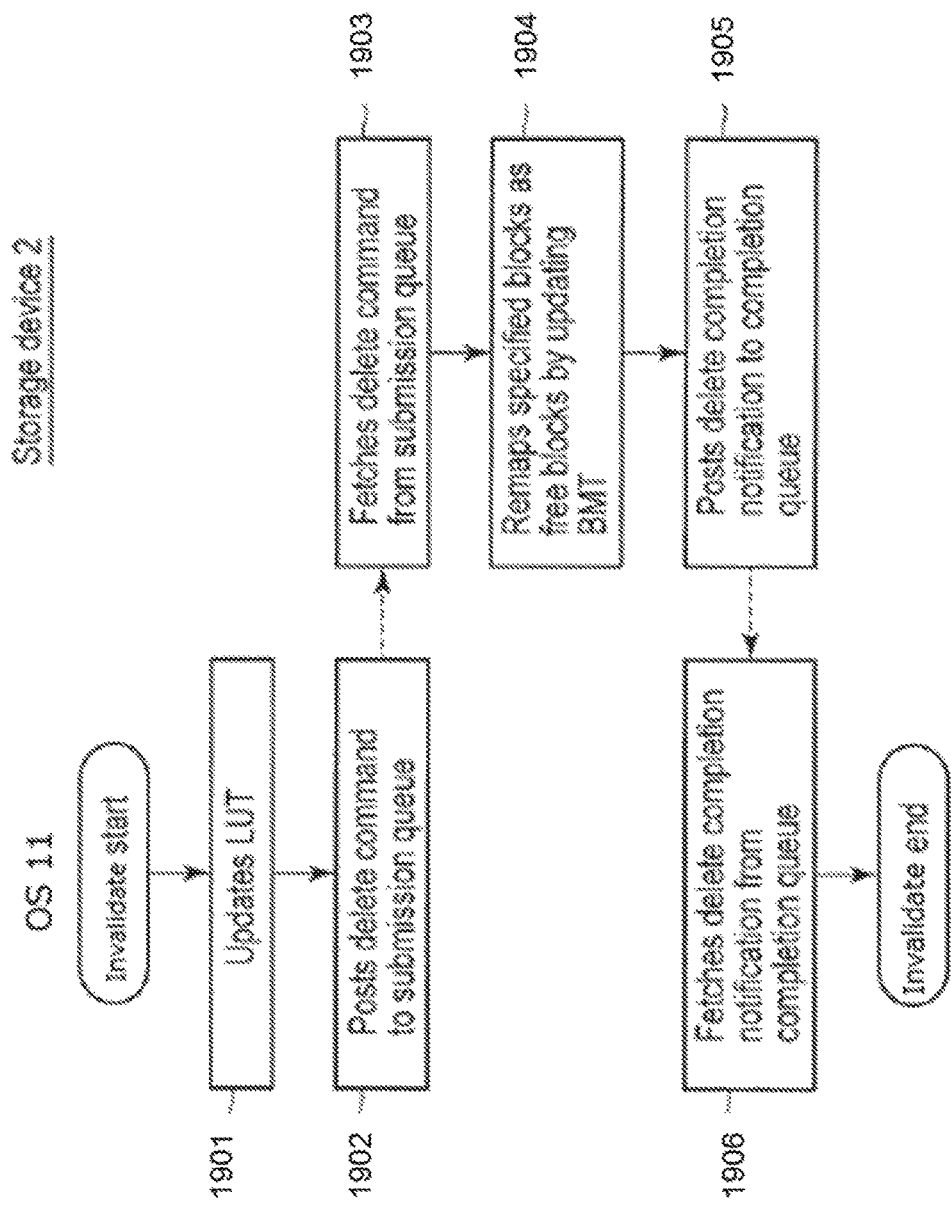
FIG. 19 is a flow chart showing an example of a local invalidation operation performed by the OS and the storage device of the single storage system.

FIG. 19 is a flow chart showing an example of a local invalidation operation performed by the OS 11 and the storage device 2 of the same storage system 1. In the local invalidation operation, the OS 11 accesses the storage device 2 via the interface 10 without using the network 8.

In step 1901, the OS 11 updates the LUT 19 to invalidate mapping to a block to be invalidated.

In step 1902, the OS 11 posts an invalidate command to the submission queue 50 in the host 3. The OS 11 includes address entries which includes a pair of the chip address (physical chip address) 57 and the block address (physical block address) 58 to be invalidated in the invalidate command.

In step 1903, the controller 14 fetches the invalidate command from the submission queue 50 via the interface 10.

In step 1904, the controller 14 remaps a block to be invalidated as the free block 44 by updating the BMT 46.

In step 1905, the controller 14 posts an invalidate completion notification to the completion queue 51 via the interface 10.

In step 1906, the OS 11 fetches the invalidate completion notification from the completion queue 51.

[Remote Invalidation Operation]

Figure 20:
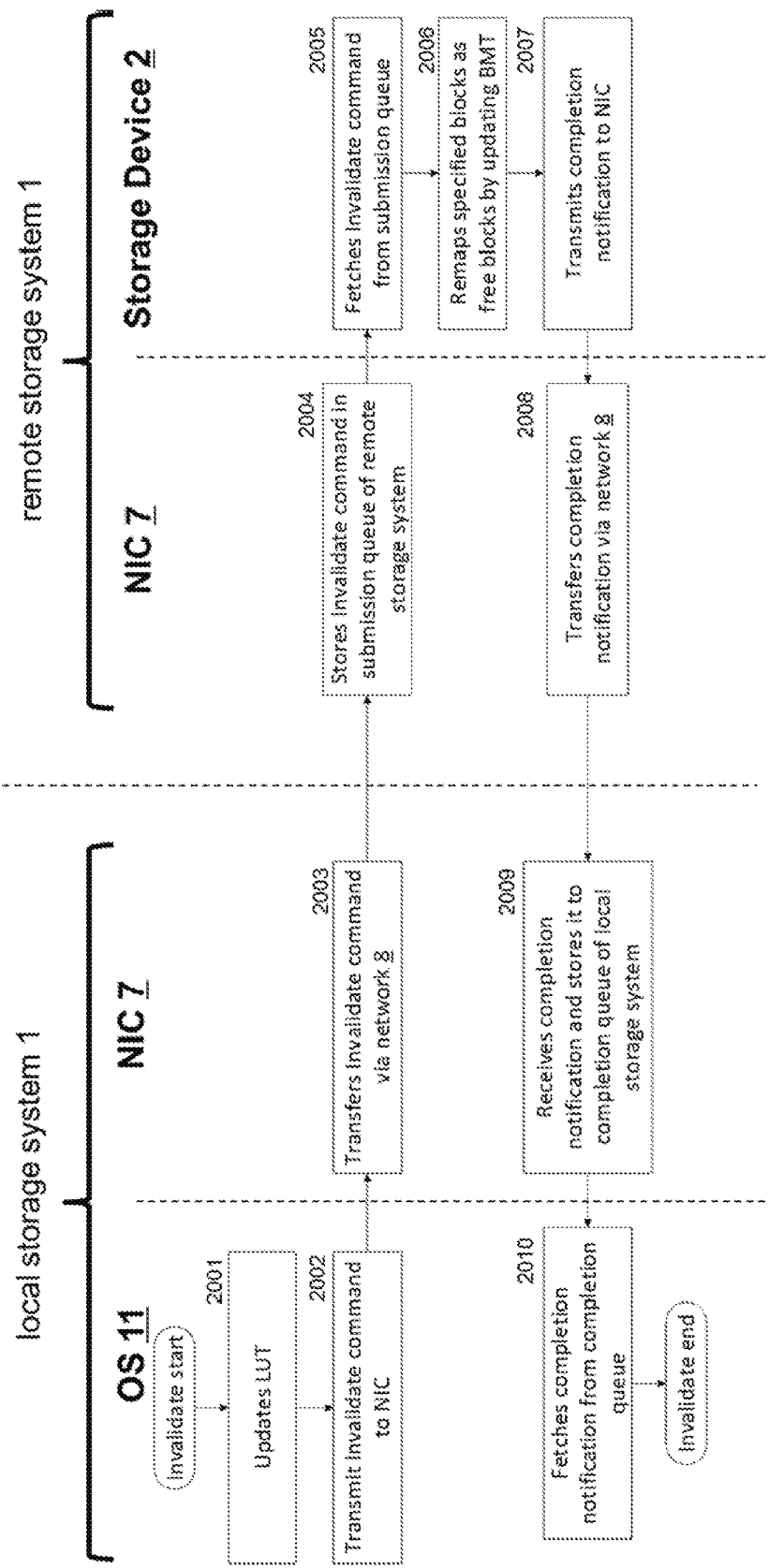
FIG. 20 is a flow chart showing an example of a remote invalidation operation performed by the local storage system and the remote storage system.

FIG. 20 is a flow chart showing an example of a remote invalidation operation performed by the OS 11 of the local storage system 1 and the storage device 2 of the remote storage system 1, which is physically different from the local storage system 1. In the remote invalidation operation, the OS 11 accesses the storage device 2 via the network 8 and the interface 10.

In step 2001, the OS 11 updates the LUT 19 to invalidate mapping to a block to be invalidated.

In step 2002, the OS 11 transmits an invalidate command to the NIC 7 of the local storage system 1. Then, in step 2003, the NIC 7 of the local storage system 1 transfers the invalidate command to the NIC 7 of the remote storage system 1. In response, in step 2004, the NIC 7 of the remote storage system 1 stores the invalidate command in the submission queue 50 of the remote storage system 1. The OS 11 includes address entries which includes a pair of the chip address (physical chip address) 57 and the block address (physical block address) 58 to be invalidated in the invalidate command.

In step 2005, the controller 14 fetches the invalidate command from the submission queue 50 via the interface 10.

In step 2006, the controller 14 remaps a block to be invalidated as the free block 44 by updating the BMT 46.

In step 2007, the controller 14 transmits an invalidate completion notification to the NIC 7 of the remote storage system 1 via the interface 10. Then, in step 2008, the NIC 7 of the remote storage system 1 transfers the notification to the NIC 7 of the local storage system 1 via the network 8. In response, in step 2009, the NIC 7 of the local storage system 1 stores the notification in the completion queue 51 of the local storage system 1.

In step 2010, the OS 11 fetches the invalidate completion notification from the completion queue 51.

[Local Copy Operation]

Figure 21:
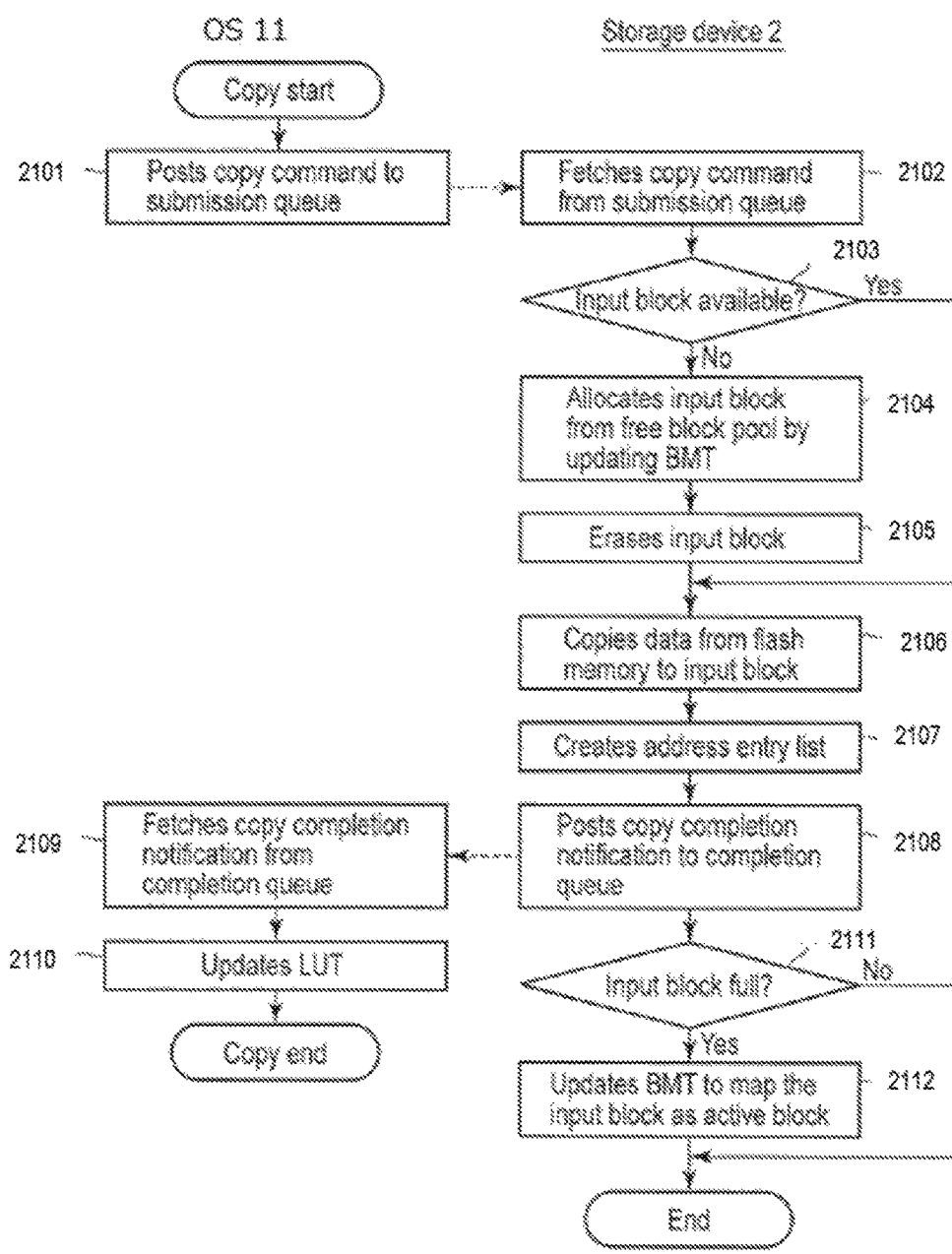
FIG. 21 is a flow chart showing an example of a local copy operation performed by the OS and the storage device of the single storage system.

FIG. 21 is a flow chart showing an example of a local copy operation performed by the OS 11 and the storage device 2 of the same storage system 1. In the local copy operation, the OS 11 accesses the storage device 2 via the interface 10 without using the network 8.

In step 2101, the OS 11 posts a copy command to the submission queue 50 of the host 3. The OS 11 includes address entries which includes a pair of the address (physical address) 56 from which data are to be copied and a size of the data to be copied in the copy command.

In step 2102, the controller 14 fetches the copy command from the submission queue 50 via the interface 10.

In step 2103, the controller 14 determines whether or not the input block 42 is available for storing the copied data. If the input block 42 is determined to be not available (No in step 2103), the process proceeds to step 2104. If the input block 42 is determined to be available (Yes in step 2103), the process proceeds to step 2106.

In step 2104, the controller 14 assigns (remaps) the input block 42 from the free block pool 440 by updating the BMT 46.

In step 2105, the controller 14 erases data stored in the assigned input block 42.

In step 2106, the controller 14 copies data from physical addresses specified by the copy command to the assigned input block 42 without transferring the data via the interface 10. At step 2106, the controller 14 may decode the data by using the ECC decoder 49 in the controller 14 when the controller 14 reads the data, and the controller 14 may encode the decoded data by using the ECC encoder 48 again.

In step 2107, the controller 14 creates an address entry list which includes physical addresses in which the copied data have been written in this local copy operation.

In step 2108, the controller 14 posts a copy completion notification including the address entry list to the completion queue 51 via the interface 10. Instead of posting the address entry list in the completion notification, the controller 14 may post a pointer containing the address entry list.

In step 2109, the OS 11 fetches the copy completion notification from the completion queue 51.

In step 2110, the OS 11 updates the LUT 19 to remap a file ID or an object ID of the copied data to the physical address of the flash memory 16 in which the copied data have been written.

In step 2111, the controller 14 determines whether or not the input block 42 becomes full. If the input block 42 is determined to become full (Yes in step 2111), in step 2112, the controller 14 updates the BMT 46 to remap the input block 42 as the active block 43. If the input block 42 is determined to not become full (No in step 2111), then the process ends.

[Extended Copy Operation (from remote to remote)]

Figure 22A:
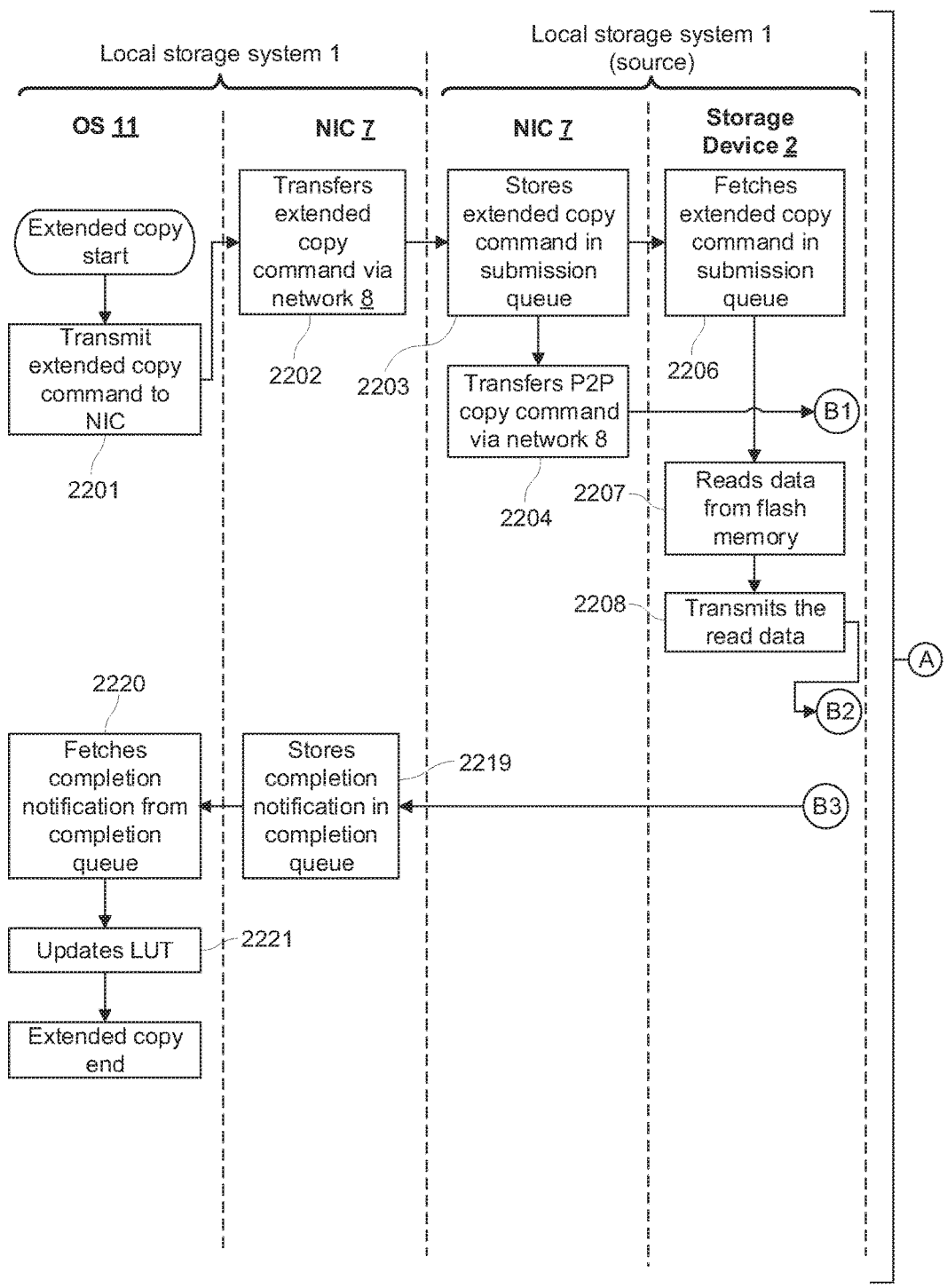
FIGS. 22A and 23B illustrate a flow chart showing an example of an extended copy operation to copy data from a remote storage system to another remote storage system.
Figure 22B:
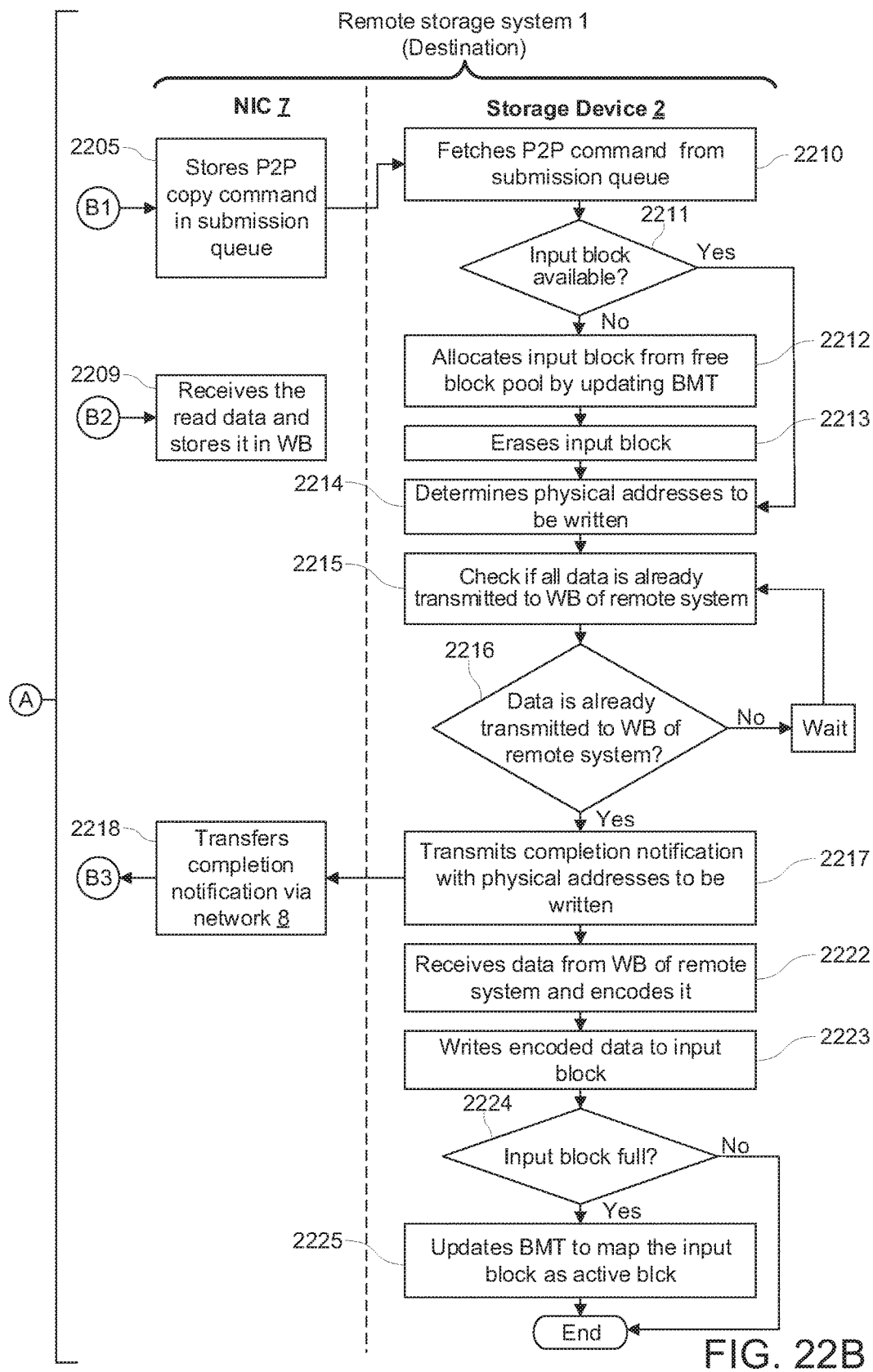

FIGS. 22A and 22B illustrate a flow chart showing an example of an extended copy process performed by the OS 11 of the local storage system 1 and storage devices 2 of two remote storage systems 1. In the extended copy process, the data are copied from a remote storage system 1 to another remote storage system 1, and the copied data are not transferred through the local storage system 1.

In step 2201, the OS 11 transmits an extended copy command to the NIC 7 of the local storage system 1. Then, in step 2202, the NIC 7 of the local storage system 1 transfers the extended copy command to the NIC 7 of a remote storage system 1, from which data are to be copied (source storage system). In response, in step 2203, the NIC 7 of the source storage system 1 stores the extended copy command in the submission queue 50 thereof.

In step 2204, the NIC 7 of the source storage system 1 transfers P2P copy command via the network 8 to the NIC 7 of a remote storage system 1, to which the copied data are to be written (destination storage system). In response, in step 2205, the NIC 7 of the destination storage system 1 stores the P2P copy command in the submission queue 50 of the destination storage system 1.

In step 2206, the controller 14 of the source storage system 1 fetches the extended copy command from the submission queue 50 thereof. In step 2207, the controller 14 reads data to be copied from the flash memory 16 thereof. Then, in step 2208, the controller 14 transmits the copied data to the destination storage system 1. In response, in step 2209, the NIC 7 of the destination storage system 1 receives the copied data and stores the copied data in the WB 20 thereof.

In step 2210, the controller 14 of the destination storage system fetches the P2P copy command from the submission queue thereof.

After step 2210, steps 2211-2225 are carried out in a similar manner as steps 1610-1624 carried out in the remote write operation shown in FIGS. 16A and 16B.

[Extended Copy Operation (from remote to local)]

Figure 23A:
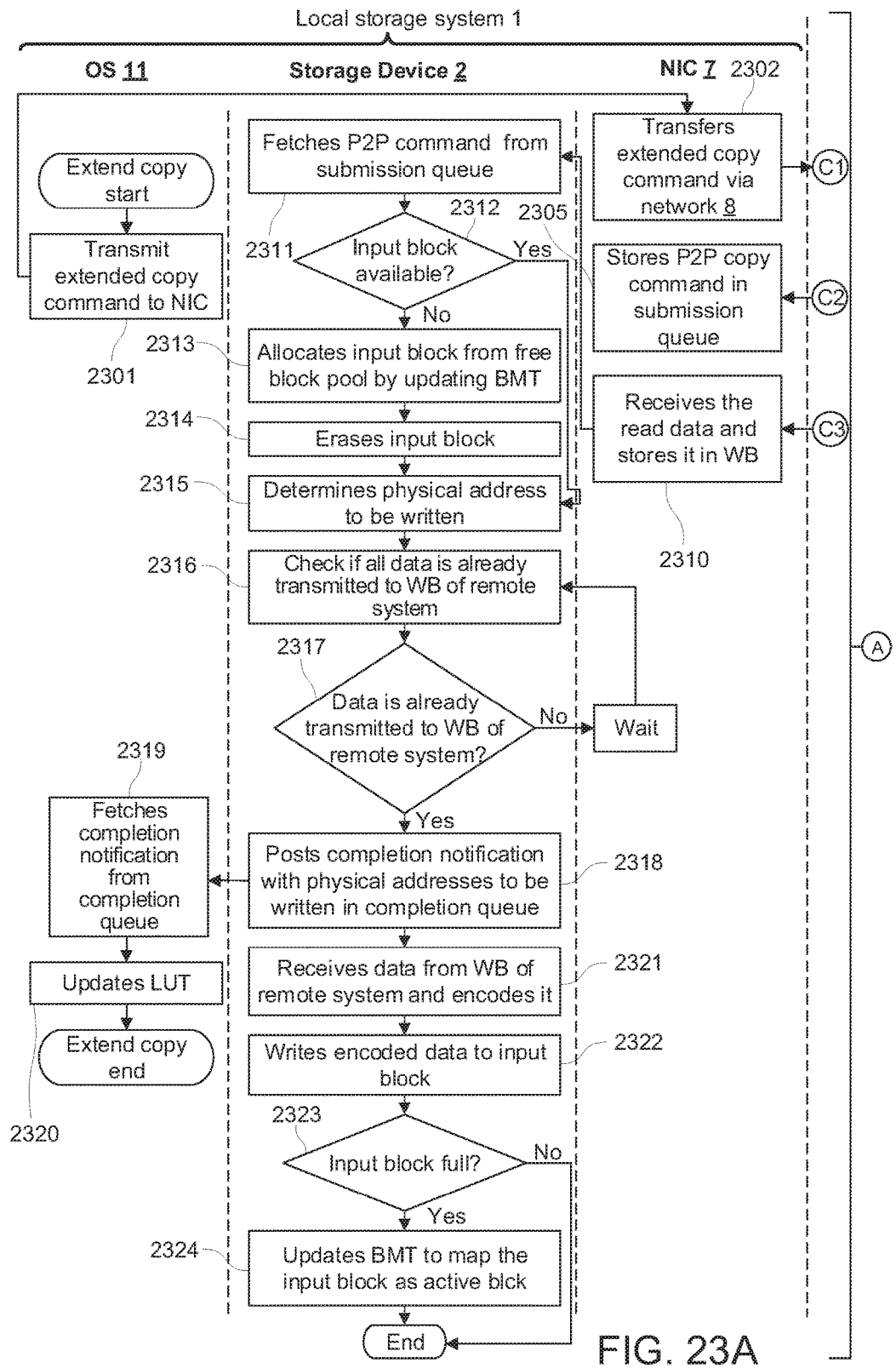
Figure 23B:
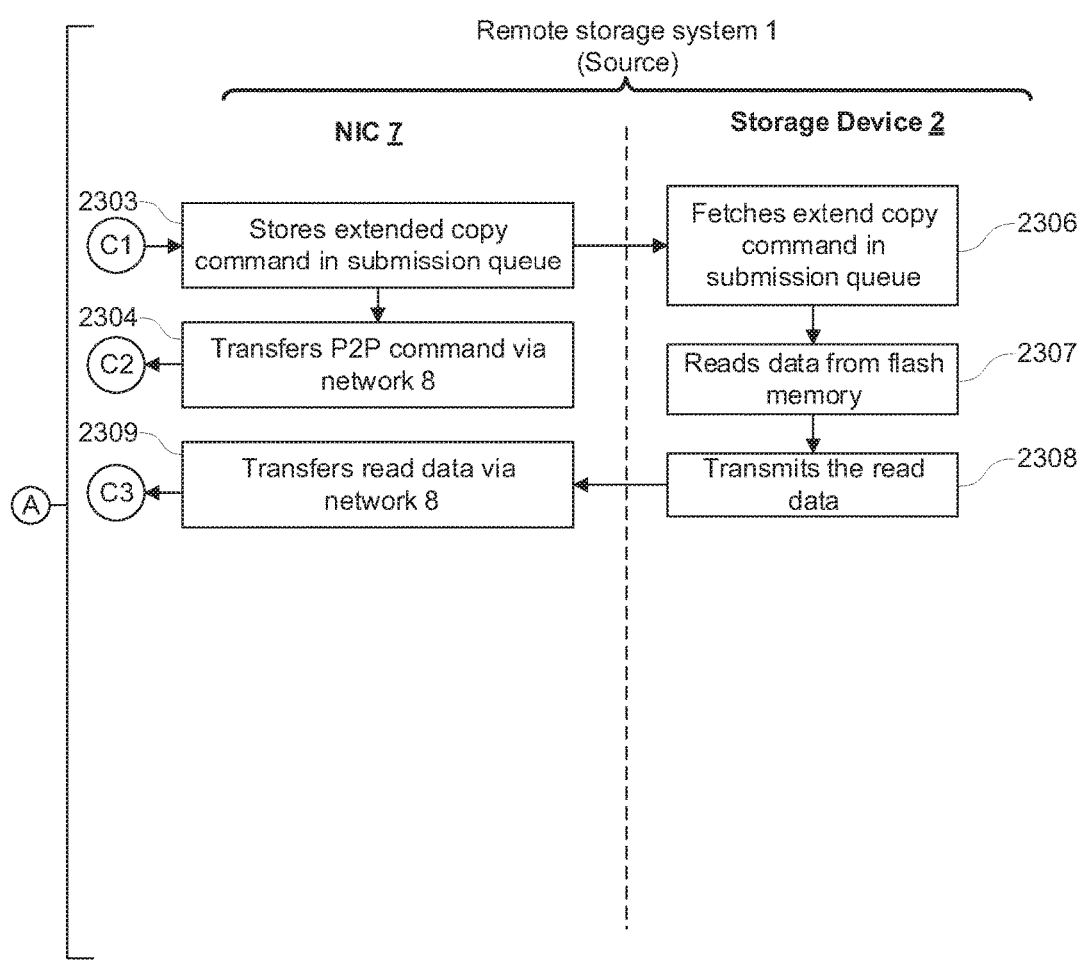

FIGS. 23A and 23B illustrate a flow chart showing another example of an extended copy operation performed by the OS 11 of the local storage system 1 and the storage device 2 of the remote storage system 1. In the extended copy operation shown in FIGS. 23A and 23B, data are copied from the remote storage system 1 to the local storage system 1.

In step 2301, the OS 11 transmits an extended copy command to the NIC 7 of the local storage system 1. Then, in step 2302, the NIC 7 of the local storage system 1 transfers the extended copy command to the NIC 7 of a remote storage system 1, from which data are to be copied (source storage system). In response, in step 2303, the NIC 7 of the source storage system 1 stores the extended copy command in the submission queue 50 thereof.

In step 2304, the NIC 7 of the source storage system 1 transfers P2P copy command via the network 8 to the NIC 7 of the local storage system 1. In response, in step 2305, the NIC 7 of the local storage system 1 stores the P2P copy command in the submission queue 50 of the local storage system 1.

In step 2306, the controller 14 of the source storage system 1 fetches the extended copy command from the submission queue 50 thereof. In step 2307, the controller 14 fetches data to be copied from the flash memory 16 thereof. Then, in step 2308, the controller 14 transmits the copied data to the NIC 7 thereof. In response, in step 2309, the NIC 7 transfers the copied data to the local storage system 1. Further, in response, in step 2310, the NIC 7 of the local storage system 1 receives the copied data and stores the copied data in the WB 20 thereof.

In step 2311, the controller 14 of the local storage system 1 fetches the P2P copy command from the submission queue 50 thereof.

After step 2311, steps 2312-2324 are carried out in a similar manner to steps 2211-2225 carried out in the extended copy operation shown in FIGS. 22A and 22B. However, different from steps 2211-2225, steps 2312-2324 are all carried out within the local storage system 1, and thus there are no steps corresponding to steps 2218 and 2219.

[Garbage Collection]

FIG. 24 is a flow chart showing an example of a garbage collection operation performed by the OS 11 and one or more storage devices 2.

In step 2401, the OS 11 determines the active block 43 to be subjected to garbage collection by referring to the LUT 19. In the LUT 19, physical addresses mapped from the File ID or Object ID correspond to addresses in which valid data are stored. In the LUT 19, physical addresses that are not mapped from the File ID or Object ID correspond to addresses associated with addresses in which invalid data are stored or no data are stored. The OS 11, by referring to the LUT 19, estimates amount of invalid data in each of the active blocks 43 (=size of physical block—size of valid data). The OS 11 selects an active block 43 storing the largest amount of invalid data (or an active block 43 having the largest ratio of invalid data to valid data) as a target block to be subjected to the garbage collection operation.

In step 2402, the OS 11 and the controller 14, through the copy operation shown in FIGS. 22A and 22B or the extended copy operation shown in FIGS. 23A and 23B or 24, copy all data stored the target block.

In step 2403, the OS 11 and the controller 14, though the invalidation operation shown in FIG. 20 or 21, invalidates the block in which data are copied in step 2402.

In step 2404, the OS 11 updates the LUT 19 to map a file ID or an object ID to the written physical address.

In the present embodiment described above, the storage device 2 does not have a Flash Translation Layer (FTL), and the controller 14 has a limited function. Compared to a storage device that has the FTL, a circuit footprint of the controller 14 that is used for the FTL can be saved, and energy consumption and manufacturing cost of the controller 14 can be reduced. Further, as the circuit footprint of the controller 14 can be reduced, memory capacity density of the storage device 2 can be increased.

Further, as management data located from the flash memory 16 by the controller 14 at the time of booting the storage device 2 are at most the BMT 46, the boot time of the storage device 2 can be shortened.

Further, according to the present embodiment, since the application software 13 accesses the storage device 2 of the remote storage system 1, a remote direct memory access (RDMA access) is performed by the control of the distributed OS Layer 12. As a result, a high-speed access is possible. In addition, the application software 13 can transparently access the storage device 2 of the remote storage system 1, as if the storage device 2 were located in the local storage system 1.

Further, since no address conversion is performed in the storage device 2 when the application software 13 reads data from the storage device 2, high-speed data reading is possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a housing;
a plurality of storage devices disposed in the housing, each of the storage devices including a nonvolatile semiconductor memory, a controller, and a communication interface; and
a host disposed in the housing, and including a processor, a memory in which mapping from an identification or a logical address of each data unit to a physical location of said each data unit is stored, an external network interface connectable to another storage system which is not disposed in said housing, through a storage system network, and an internal network controller connected to a communication interface of each of the storage devices, wherein
the processor of the host is configured to temporarily store, in the memory, an inbound access command that comes from said another storage system through the external network interface, and then transmit the stored inbound access command to one of the storage devices so as to cause a controller of the storage device to access a nonvolatile semiconductor memory thereof in accordance with the inbound access command, and
the inbound access command is issued by an operating system executed by said another storage system, which works with an operating system executed by the processor of the host in a coordinated manner.

2. The storage system according to claim 1, wherein when the inbound access command is a write command, the processor of the host temporarily stores also write data that comes through the storage system network in the memory, and then transmits the write data to said one of the storage devices so as to cause the controller thereof to write the write data in the nonvolatile semiconductor memory thereof.

3. The storage system according to claim 2, wherein the write command includes no mapping information about a location in which the write data are to be stored, and the controller of said one of the storage devices is configured to determine a physical location in which the write data are to be written and return to the host the physical location.

4. The storage system according to claim 3, wherein the processor of the host is further configured to transfer the physical location through the external network interface.

5. The storage system according to claim 1, wherein when the inbound access command is a read command, the processor of the host causes the controller of said one of the storage devices to read data from a physical location of the nonvolatile semiconductor memory thereof, the physical location being received in association with the read command, and transfers the read data to the storage system network through the external network interface.

6. The storage system according to claim 1, wherein when the inbound access command is an invalidate command, the processor of the host causes the controller of said one of the storage devices to invalidate data stored in a physical location of the nonvolatile semiconductor memory thereof, the physical location being received in association with the invalidate command, and returns a completion notification to the storage system network through the external network interface.

7. The storage system according to claim 1, wherein when the inbound access command is a copy command, the processor of the host causes the controller of said one of the storage devices to read data from a physical location of the nonvolatile semiconductor memory thereof, the physical location being received in association with the copy command, and transfers the read data towards another storage system designated by the copy command through the external network interface.

8. The storage system according to claim 1, wherein the processor of the host is further configured to generate an outbound access command and transmit the outbound access command towards another storage system connected to the storage system network, through the external network interface.

9. The storage system according to claim 8, wherein the mapping includes mapping information for data stored in another storage system connected to the storage system network.

10. The storage system according to claim 9, wherein the processor of the host determines a physical location in said another storage system to be accessed, by referring to the mapping when generating a read command, an invalidate command, or a copy command as the outbound access command, and does not determine the physical location when generating a write command as the outbound access command.

11. A method of operating a storage system connected to a storage system network connected to a plurality of storage systems, the storage system including a host externally connected to the storage system network and a plurality of storage devices internally connected to the host, the method comprising:
temporarily storing, in the host, an inbound access command that comes in from another storage system among the plurality of storage systems through the storage system network;
transmitting the stored inbound access command from the host to one of the storage devices; and
accessing, in said one of the storage devices, a nonvolatile semiconductor memory thereof in accordance with the inbound access command, wherein
the inbound access command is issued by an operating system executed by said another storage system, which works with an operating system executed by the host in a coordinated manner.

12. The method according to claim 11, wherein the inbound access command is a write command, the method further comprises:
temporarily storing, in the host, write data that comes in from said another storage system through the storage system network; and
transmitting the write data from the host to said one of the storage devices, wherein
the accessing includes writing the write data in the nonvolatile semiconductor memory thereof in accordance with the write command.

13. The method according to claim 12, wherein the write command includes no mapping information about a location in which the write data are to be stored, and
the accessing further includes determining a physical location in which the write data are to be written by said one of the storage devices, and returning to the host the physical location.

14. The method according to claim 13, further comprising:
transferring the physical location from the host to said another storage system through the storage system network.

15. The method according to claim 11, wherein
the inbound access command is a read command,
the accessing includes reading data from a physical location of the nonvolatile semiconductor memory thereof, the physical location coming in from said another storage system in association with the read command, and
the method further comprises transferring the read data from the host to said another storage system through the storage system network.

16. The method according to claim 11, wherein
the inbound access command is an invalidate command,
the accessing includes invalidating data stored in a physical location of the nonvolatile semiconductor memory thereof, the physical location coming in from said another storage system in association with the invalidate command, and
the method further comprises returning a completion notification from the host to said another storage system through the storage system network.

17. The method according to claim 11, wherein
the inbound access command is a copy command, and
the accessing includes reading data from a physical location of the nonvolatile semiconductor memory thereof, the physical location coming in from said another storage system in association with the copy command, and
the method further comprises transferring the read data from the host to another storage system designated by the copy command through the storage system network.

18. The method according to claim 11, further comprising:
storing, in the host, mapping from an identification or a logical address of data stored in another storage system in the storage system network, to a physical location of the data in said another storage system.

* * * * *